US012073168B2

(12) United States Patent
Lin et al.

(10) Patent No.: US 12,073,168 B2
(45) Date of Patent: Aug. 27, 2024

(54) LEAKAGE REDUCTION BETWEEN TWO TRANSISTOR DEVICES ON A SAME CONTINUOUS FIN

(71) Applicant: Taiwan Semiconductor Manufacturing Company, Ltd., Hsin-Chu (TW)

(72) Inventors: Chun-Yen Lin, Hsinchu (TW); Bao-Ru Young, Zhubei (TW); Tung-Heng Hsieh, Zhudong Township (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/355,501

(22) Filed: Jul. 20, 2023

(65) Prior Publication Data

US 2023/0359800 A1 Nov. 9, 2023

Related U.S. Application Data

(60) Division of application No. 17/104,730, filed on Nov. 25, 2020, now Pat. No. 11,797,743, which is a
(Continued)

(51) Int. Cl.
*G06F 30/392* (2020.01)
*H01L 27/088* (2006.01)
*H01L 29/78* (2006.01)

(52) U.S. Cl.
CPC ........ *G06F 30/392* (2020.01); *H01L 27/0886* (2013.01); *H01L 29/7831* (2013.01)

(58) Field of Classification Search
CPC ............... G06F 30/392; H01L 27/0886; H01L 29/7831
(Continued)

(56) References Cited

U.S. PATENT DOCUMENTS 6,277,756 B1    8/2001   Ohara et al.
9,741,717 B1 *   8/2017   Cheng ................. H01L 29/7851
(Continued)

FOREIGN PATENT DOCUMENTS

CN        110781641 A      2/2020
DE    102020104621 A1 *   8/2021     ..... H01L 21/823821
(Continued)

OTHER PUBLICATIONS

Learning About Electronics. "Troubleshooting—Transistor Turns on Without Any Base Current or Gate Voltage" The date of publication is unknown. Retrieved online on Sep. 27, 2019 from http://www.learningaboutelectronics.com/Articles/Circuit-troubleshooting-a-transistor-turns-on-without-base-current.
(Continued)

*Primary Examiner* — Suresh Memula
(74) *Attorney, Agent, or Firm* — Eschweiler & Potashnik, LLC

(57) ABSTRACT

In some embodiments, the present disclosure relates to a method that includes removing portions of a substrate to form a continuous fin protruding from an upper surface of the substrate. A doping process is performed to selectively increase a dopant concentration of a first portion of the continuous fin. A first gate electrode is formed over a second portion of the continuous fin, and a second gate electrode is formed over a third portion of the continuous fin. The first portion of the continuous fin is between the second and third portions of the continuous fin. A dummy gate electrode is formed over the first portion of the continuous fin. Upper portions of the continuous fin that are arranged between the first gate electrode, the second gate electrode, and the dummy gate electrode are removed, and source/drain regions are formed between the first, the second, and the dummy gate electrodes.

20 Claims, 18 Drawing Sheets

Related U.S. Application Data continuation of application No. 16/798,660, filed on Feb. 24, 2020, now Pat. No. 10,867,101.

(58) Field of Classification Search
USPC .......................................................... 716/119
See application file for complete search history.

(56) References Cited

U.S. PATENT DOCUMENTS

| | | | |
|---|---|---|---|
| 10,050,028 B2 | 8/2018 | Peng et al. | |
| 10,276,445 B2 | 4/2019 | Fan et al. | |
| 10,832,967 B2 * | 11/2020 | Zang | H01L 21/823431 |
| 11,626,507 B2 * | 4/2023 | Holland | H01L 29/167 |
| | | | 257/192 |
| 11,887,985 B2 * | 1/2024 | Hsu | H01L 27/0924 |
| 11,923,410 B2 * | 3/2024 | Rachmady | H01L 29/0673 |
| 2013/0020578 A1 | 1/2013 | Liang et al. | |
| 2013/0263077 A1 * | 10/2013 | Baek | G06F 30/398 |
| | | | 716/122 |
| 2014/0124869 A1 * | 5/2014 | Chuang | H01L 29/66636 |
| | | | 257/E21.619 |
| 2014/0227850 A1 * | 8/2014 | Zhang | H01L 27/1211 |
| | | | 438/289 |
| 2016/0078164 A1 | 3/2016 | Hsieh et al. | |
| 2016/0190236 A1 * | 6/2016 | Xu | H01L 21/823807 |
| | | | 257/369 |
| 2016/0197017 A1 * | 7/2016 | Ju | H01L 21/823821 |
| | | | 257/369 |
| 2016/0239598 A1 | 8/2016 | Kuo et al. | |
| 2016/0254190 A1 * | 9/2016 | Hsieh | H01L 21/823821 |
| | | | 438/283 |
| 2016/0379982 A1 * | 12/2016 | You | H01L 29/0657 |
| | | | 257/369 |
| 2017/0005178 A1 | 1/2017 | Duriez et al. | |
| 2017/0133377 A1 | 5/2017 | Glass et al. | |
| 2017/0186837 A1 | 6/2017 | Yen et al. | |
| 2018/0151677 A1 | 5/2018 | Glass et al. | |
| 2018/0151745 A1 | 5/2018 | Chang et al. | |
| 2018/0158841 A1 | 6/2018 | Glass et al. | |
| 2018/0337235 A1 | 11/2018 | Rachmady et al. | |
| 2018/0350969 A1 * | 12/2018 | Ching | H01L 29/785 |
| 2019/0067116 A1 | 2/2019 | Fan et al. | |
| 2019/0096891 A1 | 3/2019 | Liaw | |
| 2019/0139954 A1 * | 5/2019 | Cheng | H01L 21/32136 |
| 2019/0179993 A1 | 6/2019 | Chou et al. | |
| 2019/0214377 A1 | 7/2019 | Ryu et al. | |
| 2019/0259664 A1 | 8/2019 | Fan et al. | |
| 2019/0259765 A1 * | 8/2019 | Liaw | H01L 29/495 |
| 2019/0386112 A1 * | 12/2019 | Lu | H01L 21/32132 |
| 2020/0006331 A1 * | 1/2020 | Lilak | H01L 29/66545 |
| 2020/0006545 A1 * | 1/2020 | Liu | H01L 21/823814 |
| 2020/0118999 A1 * | 4/2020 | Alptekin | H01L 21/823878 |
| 2020/0135849 A1 * | 4/2020 | Chiang | H01L 29/66439 |
| 2020/0135880 A1 * | 4/2020 | Chen | H01L 29/66795 |
| 2020/0176590 A1 * | 6/2020 | Chuang | H01L 29/78696 |
| 2020/0185383 A1 | 6/2020 | Kim et al. | |
| 2020/0185501 A1 | 6/2020 | Ma et al. | |
| 2020/0226229 A1 | 7/2020 | Liu et al. | |
| 2020/0395462 A1 * | 12/2020 | Lin | H01L 29/66795 |
| 2021/0028312 A1 * | 1/2021 | Drowley | H01L 29/205 |
| 2021/0057544 A1 * | 2/2021 | Lin | H01L 21/28088 |
| 2021/0066310 A1 * | 3/2021 | Liaw | H01L 21/823828 |
| 2021/0296494 A1 * | 9/2021 | Xie | H01L 27/0924 |
| 2021/0376105 A1 * | 12/2021 | Lin | H01L 29/41791 |
| 2022/0285523 A1 * | 9/2022 | Malinowski | H01L 29/7851 |
| 2022/0384611 A1 * | 12/2022 | Lin | H01L 29/785 |
| 2023/0246069 A1 * | 8/2023 | Ching | H01L 27/0886 |
| | | | 257/401 |
| 2024/0030283 A1 * | 1/2024 | Jung | H01L 29/0649 |
| 2024/0113112 A1 * | 4/2024 | Chen | H01L 21/823431 |

FOREIGN PATENT DOCUMENTS

| | | | | |
|---|---|---|---|---|
| DE | 102020104621 A1 | | 8/2021 | |
| DE | 202014011552 U1 | * | 4/2022 | ........ H01L 21/28114 |
| EP | 3493270 A1 | * | 6/2019 | ........ H01L 21/0337 |
| WO | WO-2018182611 A1 | * | 10/2018 | ........... H01L 21/762 |

OTHER PUBLICATIONS

Tsu-Jae King Liu. "FinFET: History, Fundamentals and Future" Department of Electrical Engineering and Computer Sciences University of California, Berkeley, CA 94720-1770 USA, published on Jun. 11, 2012.

Zeitzoff et al. "Metrology Requirements & Challenges for Advanced FinFET Technology: Insight from TCAD Simulations" Published on Apr. 4, 2017.

Notice of Allowance dated Sep. 24, 2020 for U.S. Appl. No. 16/798,660.

Non-Final Office Action dated Apr. 27, 2023 for U.S. Appl. No. 17/104,730.

Notice of Allowance dated Jun. 28, 2023 for U.S. Appl. No. 17/104,730.

* cited by examiner

1000

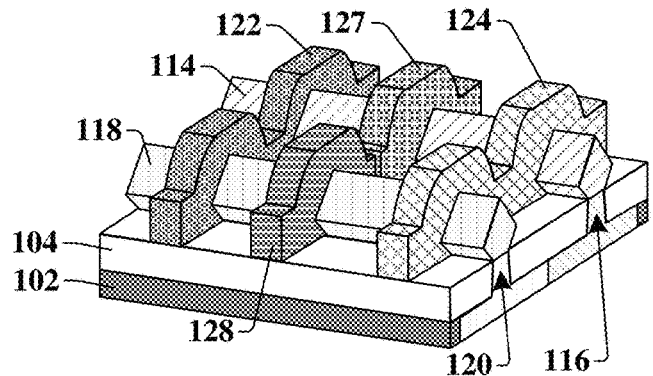

| Form a first continuous fin protruding from a substrate and having a first doping type | 1102 |

| Form a first gate electrode having a first material over the first continuous fin | 1104 |

| Form a second gate electrode having a material over the first continuous fin, wherein the second material is different from the first material of the first gate electrode | 1106 |

| Form a first gate electrode between the first and second gate electrodes, wherein the first dummy gate electrode comprises a fourth material different than the first and second materials, and wherein the first dummy gate electrode is associated with a higher threshold voltage than threshold voltages associated with the first and second gate electrodes | 1108 |

| Form source/drain regions having a second doping type over first the first continuous fin and between the first, second, and first dummy gate electrodes | 1110 |

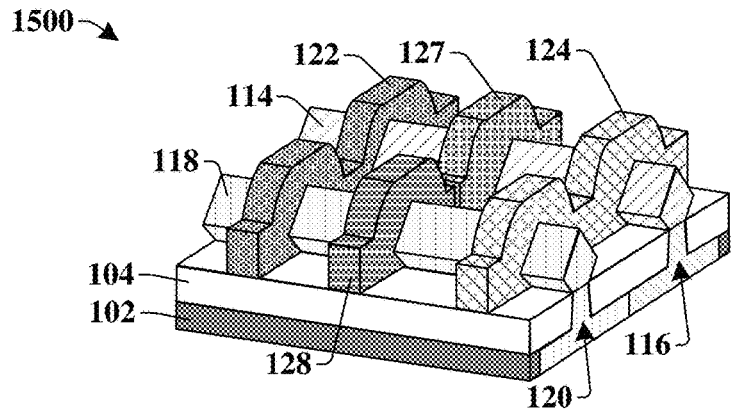

| Form a first continuous fin protruding from a substrate and having a first doping type | — 1602 |

↓

| Selectively dope a first portion of the first continuous fin to increase the doping concentration of the first portion of the first continuous fin | — 1604 |

↓

| Form a first gate electrode associated with a first threshold voltage over the first continuous fin | — 1606 |

↓

| Form a second gate electrode and a first dummy gate electrode over the first continuous fin, wherein the second gate electrode is associated with a second threshold voltage that is different than the first threshold voltage, and wherein the first dummy gate electrode is associated with a first dummy gate threshold voltage that is greater than the first and second threshold voltages | — 1608 |

↓

| Form source/drain regions having a second doping type over the first continuous fin and between the first gate electrode, second gate electrode, and first dummy gate electrode | — 1610 |

Fig. 16

LEAKAGE REDUCTION BETWEEN TWO TRANSISTOR DEVICES ON A SAME CONTINUOUS FIN

REFERENCE TO RELATED APPLICATIONS

This Application is a Divisional of U.S. application Ser. No. 17/104,730, filed on Nov. 25, 2020, which is a Continuation of U.S. application Ser. No. 16/798,660, filed on Feb. 24, 2020 (now U.S. Pat. No. 10,867,101, issued on Dec. 15, 2020). The contents of the above-referenced Patent Applications are hereby incorporated by reference in their entirety.

BACKGROUND

The semiconductor industry continues to improve the integration density of various electronic devices (e.g., transistors, diodes, resistors, capacitors, etc.) by, for example, reducing minimum feature sizes and/or arranging electronic devices closer to one another, which allows more components to be integrated into a given area. For example, a multi-transistor device may comprise more than one fin field effect transistor (finFET), wherein a first gate electrode and a second gate electrode may be arranged over a same continuous fin to reduce device area and/or to increase manufacturing efficiency.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 8, 9A-9C, and 10 illustrate some embodiments of a method of changing a threshold voltage of a second dummy gate transistor device on a second continuous fin by changing the material of a second dummy gate electrode of the second dummy gate transistor device.

FIG. 11 illustrates a flow diagram of some embodiments of a method corresponding to FIGS. 8, 9A-C, and 10.

FIGS. 12, 13A-13C, 14A-14B, and 15 illustrate some embodiments of a method of changing a threshold voltage of a second dummy gate transistor device on a second continuous fin by changing the doping concentration of the second continuous fin that directly underlies a second dummy gate electrode of the second dummy gate transistor device.

FIG. 16 illustrates a flow diagram of some embodiments of a method corresponding to FIGS. 12, 13A-C, 14A-B, and 15.

DETAILED DESCRIPTION

Figure 1A:
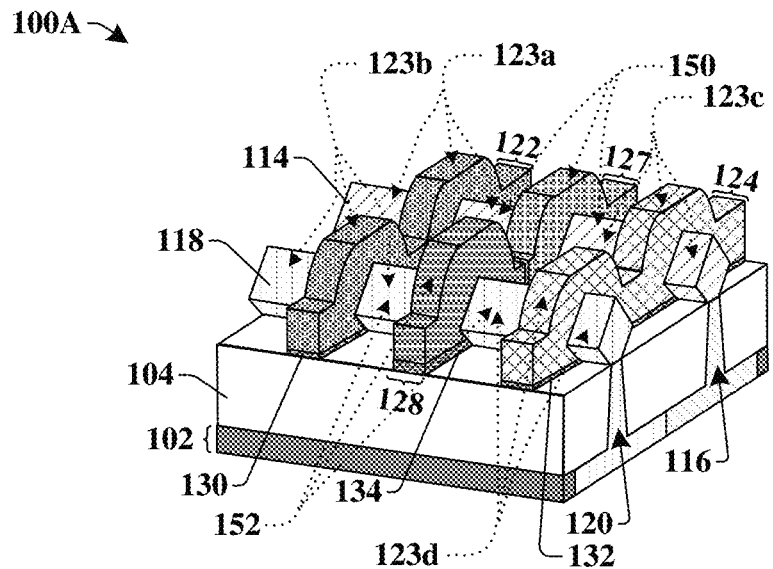
FIGS. 1A-1E illustrate various views of some embodiments of an integrated chip comprising a first dummy gate electrode arranged between first and second gate electrodes, arranged over a continuous fin, and corresponding to a first dummy transistor device with a higher threshold voltage than surrounding transistor devices.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 17:
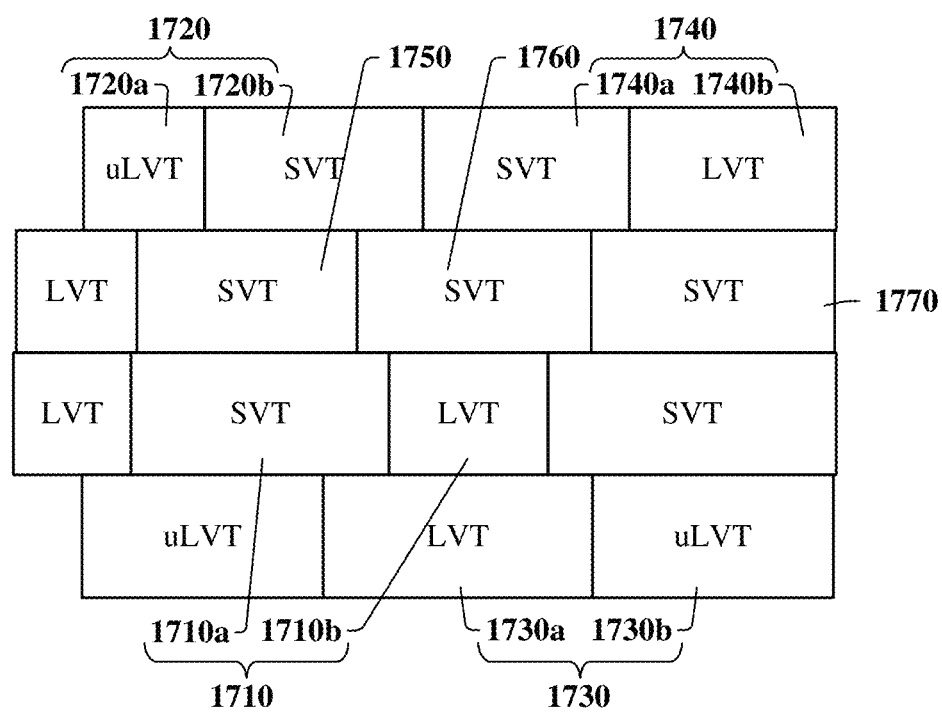
FIG. 17 illustrates some embodiments of a simplified layout view comprising functional cell units having different threshold voltages.

FIG. 17 illustrates a semiconductor device as a simplified layout view 1700 that includes a plurality of functional cell units divided into rows. A functional cell unit is configured to perform a predetermined circuit function, including a Boolean logic function, such as an inverter. In some embodiments, a functional cell unit includes a NOT gate, an AND gate, a NAND gate, an OR gate, a NOR gate, an XOR gate, an XNOR gate, another logic gate, or a combination thereof. Such a functional cell unit can therefore be termed as a standard cell. In other embodiments, a functional cell unit includes a logic gate and a passive/active device (e.g., a resistor, a capacitor, an inductor, a transistor, a diode, or the like).

The example of FIG. 17 includes several functional cell units 1710, 1720, 1730, 1740, 1750, 1760. Each of the functional cell units 1710, 1720, 1730, 1740 includes a pair of functional cells that have different threshold voltages; while functional cell units 1750, 1760 include a pair of functional cells that have the same threshold voltage. For example, functional cell unit 1710 includes a first functional cell 1710a and a second functional cell 1710b, which have different threshold voltages. Further, in some embodiments, the functional cell unit 1710 can include a first functional cell 1710a in the form of a first inverter with a standard voltage threshold (SVT), and a second functional cell 1710b in the form of a second inverter with a low voltage threshold (LVT). Further still, another functional cell unit 1720 can include an ultra-low voltage threshold (uLVT) cell 1720a, and a SVT functional cell 1720b. An LVT functional cell has a threshold voltage that is lower than a threshold voltage of an SVT functional cell but higher than a threshold voltage of a uLVT functional cell. In other embodiments, functional cell units can include only a single functional cell or more than two functional cells, wherein such functional cells can have the same threshold voltages as one another or different threshold voltages from one another.

To generate the simplified layout view 1700, an auto-place and route tool, typically in the form of auto-place and route software executed on a computer system including a microprocessor and semiconductor memory, starts with either a schematic level representation of the semiconductor device, or a functional representation of the semiconductor device (e.g., code written in a hardware description language (HDL), such as Verilog HDL). Then, the auto-place and route tool identifies functional cell units that can be coupled together to achieve the functionality specified for the semiconductor device. Upon identifying these functional cell units, the auto-place and route tool tiles layouts corresponding to the functional cell units into a chip layout, such as shown in FIG. 17, and couples the functional cell units together using conductive lines (e.g., metal lines) in the chip layout so as to ensure the proposed chip layout complies with required timing specifications and design rules for a fabrication facility where the chip will be manufactured.

In the present disclosure, the auto-place and route tool examines an initial chip layout to determine whether adjacent functional units have source and drain regions that are directly adjacent to one another, with only a dummy gate electrode separating those source and drain regions. Because these directly adjacent source and drain regions may experience different voltage potentials, the dummy gate electrode is a potential source of leakage between these source and drain regions. Thus, when the auto-place and route tool identifies this configuration in the initial chip layout, the auto-place and route tool modifies the layout to increase the threshold voltage associated with the dummy gate electrode (while leaving the threshold voltages of other transistors in the chip layout un-changed), thereby limiting the risk of current leakage for the dummy gate electrode. Because the auto-place and route tool modifies the layout to limit current leakage in the semiconductor device while still maintaining a small footprint for the chip layout, the present disclosure offers several advantages over other approaches. For example, previous approaches may have inserted "filler" cells into the layout to reduce leakage, however, these "filler" cells increased the overall chip area, which is less than ideal. By changing the threshold voltage of some dummy gate transistors without increasing the area of the chip layout, the present disclosure reduces current leakage while keeping the footprint of the chip small, which is desirable from many perspectives.

FIG. 1A illustrates a perspective view 100A of an integrated chip comprising multiple transistor (e.g., finFET) device regions, according to some embodiments. The integrated chip includes a first continuous fin 116 and a second continuous fin 120 protruding from a substrate 102 and through an isolation structure 104. The first and second continuous fins 116, 120 may extend in a first direction and be substantially parallel to one another. In some embodiments, the first continuous fin 116 may comprise first source/drain regions 114 that have a different doping type than the first continuous fin 116, and the second continuous fin 120 may comprise second source/drain regions 118 that have a different doping type than the second continuous fin 120.

A first gate electrode 122 may extend in a second direction over the first and second continuous fins 116, 120, wherein the second direction is substantially perpendicular to the first direction. The first gate electrode 122 may directly overlie a first channel region on the first continuous fin 116 and define a first transistor device 123a on the first continuous fin 116. In some embodiments, the first gate electrode 122 may also directly overlie a second channel region (e.g., 170 of FIG. 1C) on the second continuous fin 120 and define a second transistor device 123b on the second continuous fin 120. A first gate dielectric layer 130, in some embodiments, is arranged between the first gate electrode 122 and the isolation structure 104, the first continuous fin 116, and the second continuous fin 120.

The first gate electrode 122, the first gate dielectric layer 130, and/or the first continuous fin 116 comprise a first structure (e.g., thickness, material, doping concentration, etc.) that corresponds to a first threshold voltage for the first transistor device 123a, and the first gate electrode 122, the first gate dielectric layer 130, and/or the second continuous fin 120 comprise a second structure (e.g., thickness, material, doping concentration, etc.) that corresponds to a second threshold voltage for the second transistor device 123b. In some embodiments, the first transistor device 123a is an n-type device and the second transistor device 123b is a p-type device, for example. In such embodiments, the first threshold voltage may be positive, whereas the second threshold voltage may be negative.

A second gate electrode 124 may be spaced from the first gate electrode 122 in the first direction and may extend in the second direction over the first and second continuous fins 116, 120. The second gate electrode 124 may directly overlie a third channel region on the first continuous fin 116 and define a third transistor device 123c on the first continuous fin 116. In some embodiments, the second gate electrode 124 may also directly overlie a fourth channel region (e.g., 172 of FIG. 1C) on the second continuous fin 120 and define a fourth transistor device 123d on the second continuous fin 120. A second gate dielectric layer 132, in some embodiments, is arranged between the second gate electrode 124 and the isolation structure 104, the first continuous fin 116, and the second continuous fin 120.

The second gate electrode 124, the second gate dielectric layer 132, and/or the first continuous fin 116 may comprise a third structure (e.g., thickness, material, doping concentration, etc.) that corresponds to a third threshold voltage for the third transistor device 123c, and the second gate electrode 124, the second gate dielectric layer 132, and/or the second continuous fin 120 may comprise a fourth structure (e.g., thickness, material, doping concentration, etc.) that corresponds to a fourth threshold voltage for the fourth transistor device 123d. In some embodiments, the third transistor device 123c is an n-type device and the fourth transistor device 123d is a p-type device. In such embodiments, the third threshold voltage may be positive, whereas the fourth threshold voltage may be negative.

In some embodiments, the first structure is different than the third structure, and thus, the first threshold voltage of the first transistor device 123a is different that than the third threshold voltage of the third transistor device 123c. In some embodiments, the second structure is different than the fourth structure, and thus, the second threshold voltage of the second transistor device 123b is different than the fourth threshold voltage of the fourth transistor device 123d.

A first dummy gate electrode 127 may be arranged over a first dummy channel region (e.g., 176 of FIG. 1D) on the first continuous fin 116 and separate the first transistor device 123a from the third transistor device 123c. A first dummy gate dielectric layer (e.g., 136 of FIG. 1D) may be arranged between the first dummy gate electrode 127 and the first dummy channel region. The first dummy gate electrode 127 does not continuously extend and overlie the second continuous fin 120. The first dummy gate electrode 127 may be configured to always turn "OFF" (e.g., prevent current from traveling through) the first dummy channel region to prevent leakage between the first and third transistor devices 123a, 123c on the first continuous fin 116. For example, if the first continuous fin 116 is p-type, a negative or ground voltage supplied to the first dummy gate electrode 127 would turn "OFF" (e.g., prevent current from traveling through) the first dummy channel region of the first continuous fin 116.

In some embodiments, the first dummy gate electrode 127, the first dummy gate dielectric layer, and the first dummy channel region may have a same structure as the first gate electrode 122, the first gate dielectric layer 130, and the first channel region, or may have a same structure as the second gate electrode 124, the second gate dielectric layer 132, and the third channel region. For example, in the perspective view 100A of FIG. 1A, the first dummy gate electrode 127, the first dummy gate dielectric layer, and the first dummy channel region may correspond to a first dummy transistor device 150 having a first dummy gate threshold voltage that is equal to the third threshold voltage of the third transistor device 123c. In such embodiments, the first dummy gate electrode 127, the first dummy gate dielectric layer, and the first dummy channel region may have a same structure (e.g., thickness, material, doping concentration, etc.) as the second gate electrode 124, the second gate dielectric layer 132, and the third channel region.

A second dummy gate electrode 128 may be arranged over a second dummy channel region (see, 174 of FIG. 1C) on the second continuous fin 120 and separate the second transistor device 123b from the fourth transistor device 123d. A second dummy gate dielectric layer 134 may be arranged between the second dummy gate electrode 128 and the second dummy channel region. The second dummy gate electrode 128 may be separated from the first dummy gate electrode 127. The second dummy gate electrode 128 may be configured to always turn "OFF" (e.g., prevent current from traveling through) the second dummy channel region to prevent leakage between the second and fourth transistor devices 123b, 123d on the second continuous fin 120. For example, if the second continuous fin 120 is n-type, a positive voltage supplied to the second dummy gate electrode 128 would turn "OFF" (e.g., prevent current from traveling through) the second dummy channel region of the second continuous fin 120.

In some embodiments, the second dummy gate electrode 128, the second dummy gate dielectric layer 134, and the second dummy channel region of the second continuous fin 120 may correspond to a second dummy transistor device 152 having a second dummy gate threshold voltage that is greater than the second and fourth threshold voltages to ensure that leakage between the second and fourth transistor devices 123b, 123d is prevented through the second dummy channel. In other words, in some embodiments, the second dummy channel region of the second continuous fin 120 may be more difficult to turn "ON" (e.g., allow current to travel through) than the second and fourth channel regions. In such embodiments, the second dummy gate electrode 128 may have a different structure than the first and second gate electrodes 122, 124, the second dummy gate dielectric layer 134 may have a different structure than the first and second gate dielectric layers 130, 132, and/or the second dummy channel region may have a different structure than the second and fourth channel regions. For example, in the perspective view 100A of FIG. 1A, the second dummy gate dielectric layer 134 may be thicker than the first and/or second gate dielectric layers 130, 132.

Thus, in some embodiments of an integrated chip comprising multiple device regions, to ensure that leakage is prevented between a second transistor device 123b having a second threshold voltage and a fourth transistor device 123d having a fourth threshold voltage different than the second threshold voltage, a second dummy gate electrode 128 and second dummy transistor device 152 arranged between the second and fourth transistor devices 123b, 123d may be designed to have a higher threshold voltage than the second and fourth threshold voltages. By preventing leakage between devices with different threshold voltages, power-loss is reduced and device reliability is increased.

Figure 1B:
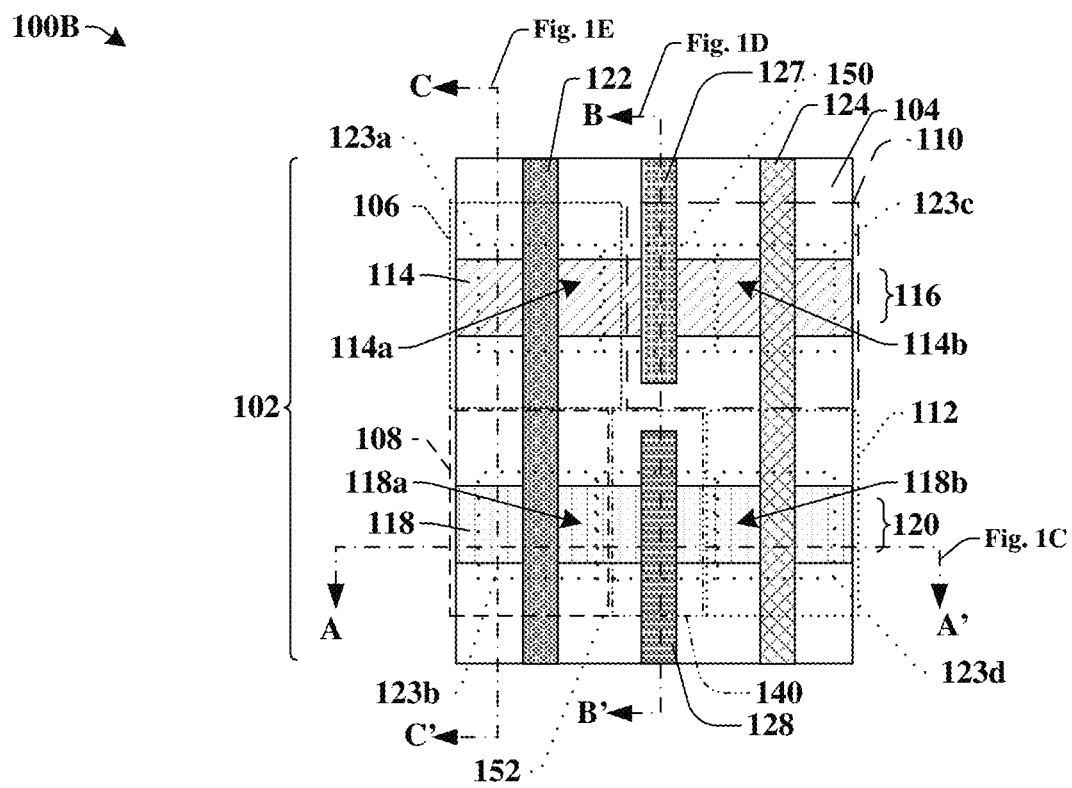

FIG. 1B illustrates a top-view 100B of some embodiments of an integrated chip corresponding to the perspective view 100A of FIG. 1A.

As illustrated in the top-view 100B, in some embodiments, the first dummy transistor device 150 shares a first one 114a of the first source/drain regions 114 with the first transistor device 123a, and the first dummy transistor device 150 shares a second one 114b of the first source/drain regions 114 with the third transistor device 123c. The first dummy transistor device 150 comprises the first dummy gate electrode 127 configured to prevent current from flowing between the first and second ones 114a, 114b of the first source/drain regions 114, thereby maintaining isolation between the first transistor device 123a and the third transistor device 123c even though the first and third transistor devices 123a, 123c share the same first continuous fin 116.

Further, the second dummy transistor device 152 shares a first one 118a of the second source/drain regions 118 with the second transistor device 123b, and the second dummy transistor device 152 shares a second one 118b of the second source/drain regions 118 with the fourth transistor device 123d. The second dummy transistor device 152 comprises the second dummy gate electrode 128 configured to prevent current from flowing between the first and second ones 118a, 118b of the second source/drain regions 118, thereby maintaining isolation between the second transistor device 123b and the fourth transistor device 123d even though the second and fourth transistor devices 123b, 123d share the same second continuous fin 120.

In some embodiments, for example, the absolute value of the first threshold voltage is greater than the absolute value of the third threshold voltage, and the absolute value of the second threshold voltage is greater than the absolute value of the fourth threshold voltage. In some embodiments, the first continuous fin 116 is p-type, the first source/drain regions 114 are n-type, the second continuous fin 120 is n-type, and the second source/drain regions 118 are p-type. In such embodiments, a low threshold voltage n-type device region 106 of the integrated chip may comprise the first transistor device 123a; a low threshold voltage p-type device region 108 of the integrated chip may comprise the second transistor device 123b; an ultra-low threshold voltage n-type device region 110 of the integrated chip may comprise the third transistor device 123c; and an ultra-low threshold voltage p-type device region 112 may comprise the fourth transistor device 123d.

In some embodiments, the absolute value of the first dummy threshold voltage of the first dummy transistor device 150 may be about equal to the absolute value of the third threshold voltage of the third transistor device 123c, and thus, the ultra-low threshold voltage n-type device region 110 of the integrated chip may also comprise the first dummy transistor device 150. The low threshold voltage n-type device region 106 and the ultra-low threshold voltage n-type device region 110 are arranged over the same first continuous fin 116. In some embodiments, the absolute value of the second dummy threshold voltage of the second dummy transistor device 152 may be greater than the absolute values of both the second threshold voltage of the second transistor device 123b and the fourth threshold voltage of the fourth transistor device 123d. For example, in some embodiments, the absolute value of the fourth threshold voltage may be in a range of between approximately 0.05 volts and approximately 0.1 volts; the absolute value of the second threshold voltage may be in a range of between approximately 0.1 volts and approximately 0.15 volts; and the absolute value of the second dummy threshold voltage may be in a range of between approximately 0.25 volts and approximately 0.3 volts.

In such embodiments, a standard threshold voltage p-type device region 140 of the integrated chip may be arranged between the low threshold voltage p-type device region 108 and the ultra-low threshold voltage p-type device region 112, and the standard threshold voltage p-type device region 140 may comprise the second dummy transistor device 152. The low threshold voltage p-type device region 108, the ultra-low threshold voltage p-type device region 112, and the standard threshold voltage p-type device region 140 are arranged over the same second continuous fin 120.

Figure 1C:
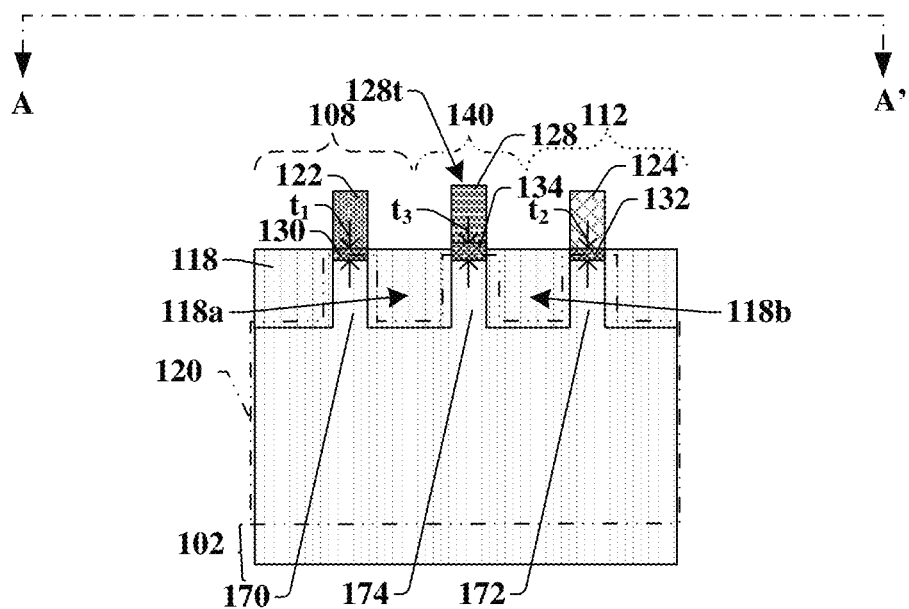

FIG. 1C illustrates a cross-sectional view 100C of some embodiments of an integrated chip corresponding to cross-section line AA' of the top-view 100B of FIG. 1B.

In some embodiments, the second continuous fin 120 comprises a second channel region 170 under the first gate electrode 122, a fourth channel region 172 under the second gate electrode 124, and a second dummy channel region 174 under the second dummy gate electrode 128. The second source/drain regions 118 may be arranged between the second channel region 170, the fourth channel region 172, and the second dummy channel region 174. Thus, in some embodiments, the first one 118a of the second source/drain regions 118 is arranged directly between the second channel region 170 and the second dummy channel region 174 of the second continuous fin 120, and the second one 118b of the second source/drain regions 118 is arranged directly between the second dummy channel region 174 and the fourth channel region 172. In some embodiments, the second and fourth channel regions 170, 172 have a same doping concentration. In some embodiments, the second dummy channel region 174 also has a same doping concentration as the second and fourth channel regions 170, 172.

In some embodiments, the first gate dielectric layer 130 may have a first thickness $t_1$, and the second gate dielectric layer 132 may have a second thickness $t_2$. In some embodiments, the first and second thicknesses $t_1$, $t_2$ may be about equal to one another. In some embodiments, the materials of the first and second gate electrodes 122, 124 may be different from one another while the first and second gate dielectric layers 130, 132 have equal first and second thicknesses $t_1$, $t_2$ and/or comprise a same material, such that the low threshold voltage p-type device region 108 has a different threshold voltage than the ultra-low threshold voltage p-type device region 112. In other embodiments, the materials of the first and second gate dielectric layers 130, 132 may be different than one another and/or the first and second thicknesses $t_1$, $t_2$ may be different than one another, whereas the first and second gate electrodes 122, 124 may comprise a same material, such that the low threshold voltage p-type device region 108 has a different threshold voltage than the ultra-low threshold voltage p-type device region 112. In some embodiments, the first thickness $t_1$ and the second thickness $t_2$ may each be in a range of, for example, between approximately 5 nanometers and approximately 30 nanometers.

In some embodiments, the second dummy gate electrode 128 and/or the second dummy gate dielectric layer 134 comprise a different structure (e.g., material, thickness, doping concentration, etc.) than the first gate electrode 122 and/or the first gate dielectric layer 130 and comprise a different structure than the second gate electrode 124 and/or the second gate dielectric layer 132. In such embodiments, for example, the second dummy gate dielectric layer 134 may have a third thickness $t_3$ that is greater than both the first and second gate dielectric layers 130, 132. In some embodiments, the third thickness $t_3$ may also be in a range of, for example, between approximately 5 nanometers and approximately 30 nanometers. In such embodiments, the second dummy threshold voltage of the standard threshold voltage p-type device region 140 is greater than the second threshold voltage of the low threshold voltage p-type device region 108 and the ultra-low threshold voltage p-type device region 112. In such embodiments, because the second dummy gate electrode 128 is arranged over the second dummy gate dielectric layer 134 that is thicker than the first and second gate dielectric layers 130, 132, the second dummy gate electrode 128 may have a topmost surface 128t that is above topmost surfaces of the first and second gate electrodes 122, 124. In other embodiments (not shown), the topmost surface 128t of the second dummy gate electrode 128 may be about even with topmost surfaces of the first and second gate electrodes 122, 124 due to, for example, planarization processes during manufacturing.

It will be appreciated that in other embodiments, the second dummy threshold voltage of the standard threshold voltage p-type device region 140 may also be adjusted using a different material for the second dummy gate electrode 128, using a different material for the second dummy gate dielectric layer 134, including a work function layer between the second dummy gate electrode 128 and the second dummy gate dielectric layer 134, adjusting the doping concentration of the second dummy gate electrode 128 and/or the second dummy channel region 174, and/or a combination thereof.

Thus, although the low threshold voltage p-type device region 108, the ultra-low threshold voltage p-type device region 112, and the standard threshold voltage p-type device region 140 are arranged on the same second continuous fin 120, the second dummy gate electrode 128 may be configured to always turn "OFF" (e.g., prevent current from traveling through) the second dummy channel region 174 to prevent leakage between the low threshold voltage p-type device region 108 and the ultra-low threshold voltage p-type device region 112.

Figure 1D:
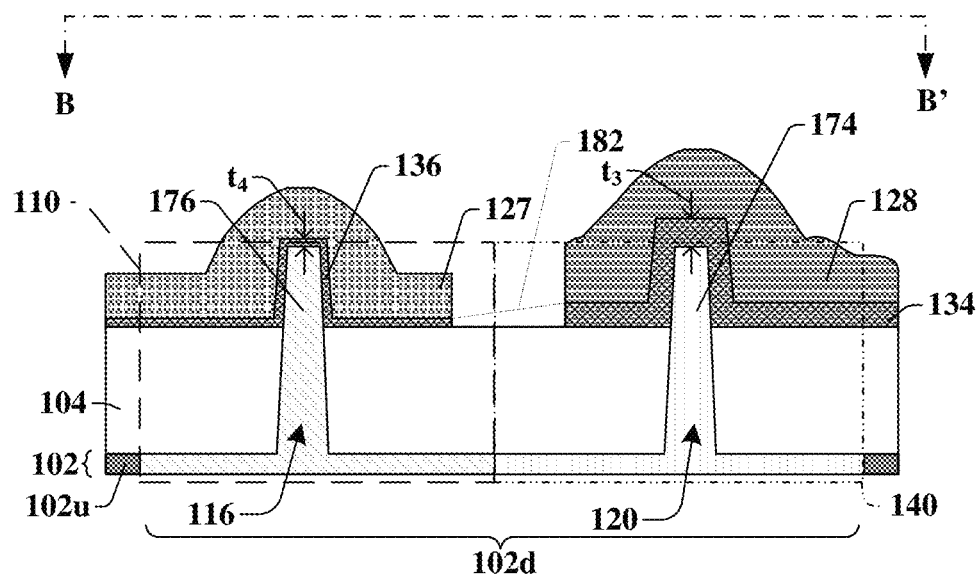

FIG. 1D illustrates a cross-sectional view 100D of some embodiments of an integrated chip corresponding to cross-section line BB' of the top-view 100B of FIG. 1B.

The cross-sectional view 100D includes the first dummy gate electrode 127 that is spaced apart from the second dummy gate electrode 128 and arranged over the substrate 102. The first dummy gate electrode 127 covers a first dummy channel region 176 of the first continuous fin 116. Thus, the second dummy gate electrode 128 is electrically isolated from the first dummy gate electrode 127. In some embodiments, the substrate has a doped portion 102d between an undoped portion 102u. The first and second continuous fins 116, 120 may each have a different doping type and protrude continuously from the doped portion 102d of the substrate 102. Thus, the first and second continuous fins 116, 120 may comprise a same material (e.g., silicon) as the substrate 102.

In some embodiments, the second dummy gate dielectric layer 134 may be arranged beneath the second dummy gate electrode 128 and have the third thickness $t_3$, whereas a first dummy gate dielectric layer 136 may be arranged beneath the first dummy gate electrode 127 and have a fourth thickness $t_4$ that is less than the third thickness $t_4$. In other embodiments, the third thickness $t_3$ may be about equal to the fourth thickness $t_4$. Further, although in some embodiments the first dummy gate electrode 127 is spaced apart from the second dummy gate electrode 128 and the first dummy gate dielectric layer 136 is spaced apart from the second dummy gate dielectric layer 134, in other embodiments, the second dummy gate dielectric layer 134 and the first dummy gate dielectric layer 136 may be continuously connected to one another, as illustrated by dotted line 182, for example. As illustrated in the cross-sectional view 100D of FIG. 1D, in some embodiments, the absolute value of the second dummy threshold voltage that corresponds to the second dummy gate electrode 128 may be greater than the absolute value of the first dummy threshold voltage that corresponds to the first dummy gate electrode 127 because, for example, the second dummy gate dielectric layer 134 is thicker than the first dummy gate dielectric layer 136. In other embodiments, the absolute value of the second dummy threshold voltage may be about equal to or less than the absolute value of the first dummy threshold voltage, depending on the material(s) of the first and second dummy gate electrodes 127, 128 and/or the doping concentrations of the first dummy channel region 176 and the second dummy channel region 174, for example.

Figure 1E:
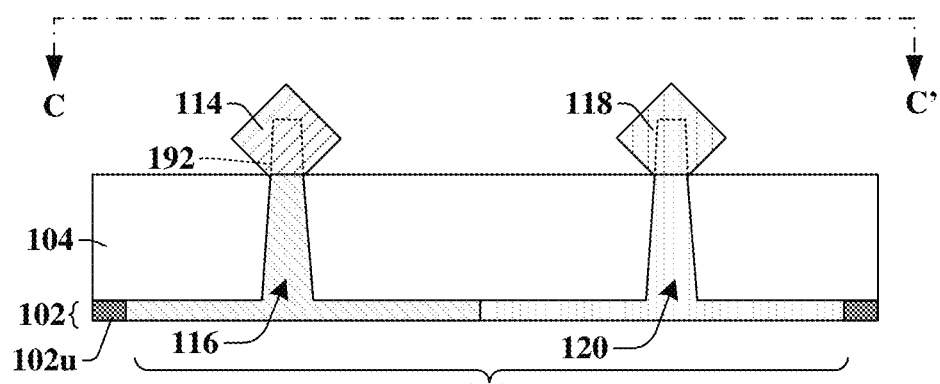

FIG. 1E illustrates a cross-sectional view 100E of some embodiments of an integrated chip corresponding to cross-section line CC' of the top-view 100B of FIG. 1B.

In some embodiments, the first source/drain regions 114 and the second source/drain regions 118 may exhibit diamond-like shapes in the cross-sectional view 100E. The diamond-like shape may be due to the first and second source/drain regions 114, 118 being epitaxial grown on the first and second continuous fins 116, 120, respectively. In other embodiments, the first and second source/drain regions 114, 118 may exhibit a more trapezoidal-like shape like the first and second continuous fins 116, 120, respectively, as illustrated by dotted lines 192. The first and second source/drain regions 114, 118 may be arranged above the isolation structure 104. In some embodiments, the first source/drain regions 114 have an opposite doping type than the first continuous fin 116, and the second source/drain regions 118 have an opposite doping type than the second continuous fin 120.

Figure 2A:
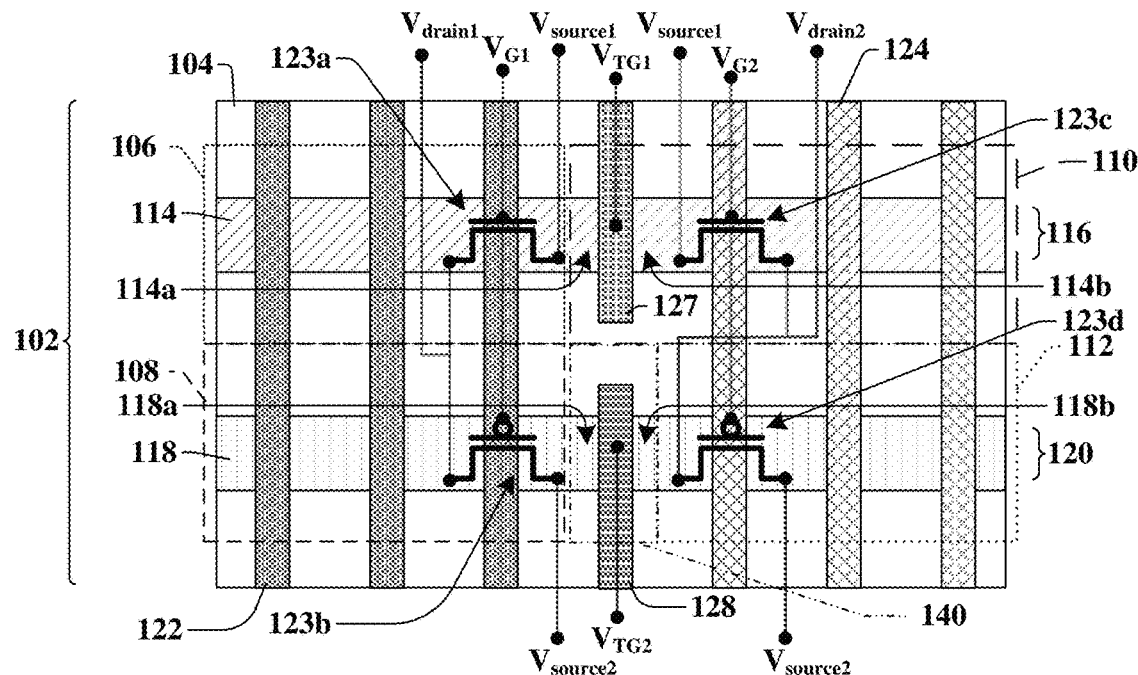
FIGS. 2A and 2B illustrate top-views of some embodiments of a circuit diagram corresponding to a first gate electrode, a second gate electrode, a first dummy gate electrode, and a second dummy gate electrode over first and second continuous fins.

FIG. 2A illustrates a top-view 200A of some embodiments an integrated chip comprising multiple transistor (e.g., finFET) device regions, and a circuit diagram that corresponds to some of the multiple transistor device regions.

In some embodiments, the low threshold voltage n-type device region 106 and the low threshold voltage p-type device region 108 may comprise multiple first gate electrodes 122. In some embodiments, each of the first gate electrodes 122 may be coupled to an individual gate terminal, whereas in other embodiments, the multiple first gate electrodes 122 may be coupled to and share a same gate terminal. Similarly, in some embodiments, the ultra-low threshold voltage n-type device region 110 and the ultra-low threshold voltage p-type device region 112 may comprise multiple second gate electrodes 124. In some embodiments, each of the second gate electrodes 124 may be coupled to an individual gate terminal, whereas in other embodiments, the multiple second gate electrodes 124 may be coupled to and share a same gate terminal.

In some embodiments, the first gate electrode 122 is coupled to a first gate terminal $V_{G1}$, and the second gate electrode 124 is coupled to a second gate terminal $V_{G2}$. Further, the first dummy gate electrode 127 may be coupled to a first dummy gate terminal $V_{TG1}$, and the second dummy gate electrode 128 may be coupled to a second dummy gate terminal $V_{TG2}$.

The first and second source/drain regions 114, 118 may dictate the structures of the first and second dummy gate electrodes 127, 128 and/or underlying layers of the first and second dummy gate electrodes 127, 128. For example, in the top-view 200A of FIG. 1A, the first one 114a of the first source/drain regions 114 is coupled to a first source terminal $V_{source1}$, and the second one 114b of the first source/drain regions 114 is coupled to the first source terminal $V_{source1}$. The first one 118a of the second source/drain regions 118 is coupled to a second source terminal $V_{source2}$, and the second one 118b of the second source/drain regions 118 is coupled to a second drain terminal $V_{drain2}$. Because the first one 114a of the first source/drain regions 114 and the second one 114b of the first source/drain regions 114 are each coupled to the first source terminal $V_{source1}$, leakage between the first transistor device 123a and the third transistor device 123c via the first dummy channel region (176 of FIG. 1D) is minimal. Thus, the first dummy gate threshold voltage corresponding to the first dummy gate electrode 127 does not have to be greater than the first threshold voltage of the first transistor device 123a and the third threshold voltage of the third transistor device 123c.

However, because the second one 118b of the second source/drain regions 118 is coupled to the second drain terminal $V_{drain2}$, leakage between the second transistor device 123b and the fourth transistor device 123d is a concern. Thus, the second dummy gate electrode 128 is designed such that the second dummy gate threshold voltage is greater than both the second threshold voltage of the second transistor device 123b and the fourth threshold voltage of the fourth transistor device 123d. In other words, in some embodiments, the standard threshold voltage p-type device region 140 comprises the second dummy gate electrode 128, is arranged between the low threshold voltage p-type device region 108 and the ultra-low threshold voltage p-type device region 112, and has a greater threshold voltage than the low threshold voltage p-type device region 108 and the ultra-low threshold voltage p-type device region 112 because at least one of the first or second ones 118a, 118b of the second source/drain regions 118 is coupled to the second drain terminal $V_{drain2}$.

Figure 2B:
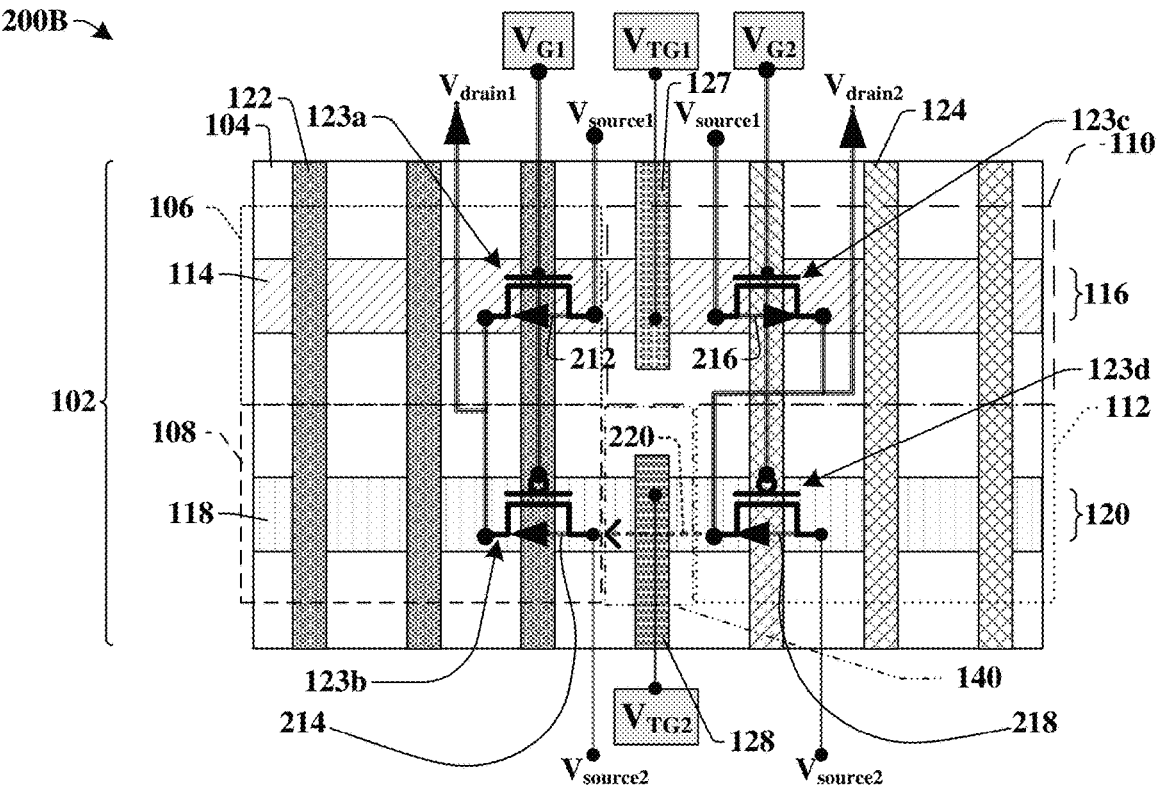

FIG. 2B illustrates a top-view 200B of some embodiments corresponding to the top-view 200A of FIG. 2A to show exemplary mobile charge carrier pathways when voltages are applied to the first gate electrode 122, the first dummy gate electrode 127, the second dummy gate electrode 128, and/or the second gate electrode 124.

In some embodiments, the first and third transistor devices 123a, 123c are n-type devices, and the second and fourth transistor devices 123b, 123d are p-type devices. In such embodiments, the first and second transistor devices 123a, 123b form a first inverter controlled by the first gate electrode 122, and the third and fourth transistor devices 123c, 123d form a second inverter controlled by the second gate electrode 124. For example, when a positive voltage that is greater than the first threshold voltage of the first transistor device 123a is applied to the first gate terminal $V_{G1}$ of the first gate electrode 122, the first channel region may be turned "ON," the second channel region may be turned "OFF," and mobile charge carriers may flow in the direction of the first exemplary pathway 212 from the first source terminal $V_{source1}$ (e.g., ground) to the first drain terminal $V_{drain1}$ of the first transistor device 123a. Thus, the first exemplary pathway 212 is in a direction away from the first dummy gate electrode 127, and leakage from the first transistor device 123a to the third transistor device 123c is minimal.

Further, for example, when a negative voltage that is more negative than the second threshold voltage of the second transistor device 123b is applied to the first gate terminal $V_{G1}$ of the first gate electrode 122, the second channel region may be turned "ON," the first channel region may be turned "OFF," and mobile charge carriers may flow in the direction of the second exemplary pathway 214 from the second source terminal $V_{source2}$ (e.g., $V_{ss}$) to the first drain terminal $V_{drain1}$ of the second transistor device 123b. Thus, the second exemplary pathway 214 is in a direction away from the second dummy gate electrode 128, and leakage from the second transistor device 123b to the fourth transistor device 123d is minimal.

Further, for example, when a positive voltage that is greater than the third threshold voltage of the third transistor device 123c is applied to the second gate terminal $V_{G2}$ of the second gate electrode 124, the third channel region may be turned "ON," the fourth channel region may be turned "OFF," and mobile charge carriers may flow in the direction of the third exemplary pathway 216 from the first source terminal $V_{source1}$ to the second drain terminal $V_{drain2}$ of the third transistor device 123c. Thus, the third exemplary pathway 216 is in a direction away from the first dummy gate electrode 127, and leakage from the third transistor device 123c to the first transistor device 123a is minimal. Thus, in such embodiments, where the first and second ones 114a, 114b of the first source/drain regions 114 are coupled to source terminals (e.g., first source terminal $V_{source1}$), leakage between the first and third transistor devices 123a, 123c is minimal, and voltage applied to the first dummy gate terminal $V_{TG1}$ to turn "OFF" the first dummy channel region is sufficient in mitigating leakage.

Further, for example, when a negative voltage that is more negative than the fourth threshold voltage of the fourth transistor device 123d is applied to the second gate terminal $V_{G2}$ of the second gate electrode 124, the fourth channel region may be turned "ON," the third channel region may be turned "OFF," and mobile charge carriers may flow in the direction of the fourth exemplary pathway 218 from the second source terminal $V_{source2}$ to the first drain terminal $V_{drain1}$ of the second transistor device 123b. Thus, the second exemplary pathway 214 is in a direction towards the second dummy gate electrode 128, and leakage from the second transistor device 123b to the fourth transistor device 123d is a concern. In such embodiments, voltage applied to the second dummy gate terminal $V_{TG2}$ to turn "OFF" the second dummy channel region may not be sufficient in preventing leakage between the second and fourth transistor devices 123b, 123d. The mobile charge carriers flowing in the direction of the fourth exemplary pathway 218 may overcome the second dummy gate threshold voltage and continue to flow along an exemplary leakage pathway 220 to the second transistor device 123b. However, because the standard threshold voltage p-type device region 140 is arranged between the low threshold voltage p-type device region 108 and the ultra-low threshold voltage p-type device region 112, the mobile charge carriers are prevented from traveling along the exemplary leakage pathway 220 and a reliable output voltage may be read at the second drain terminal $V_{drain2}$.

Figure 3A:
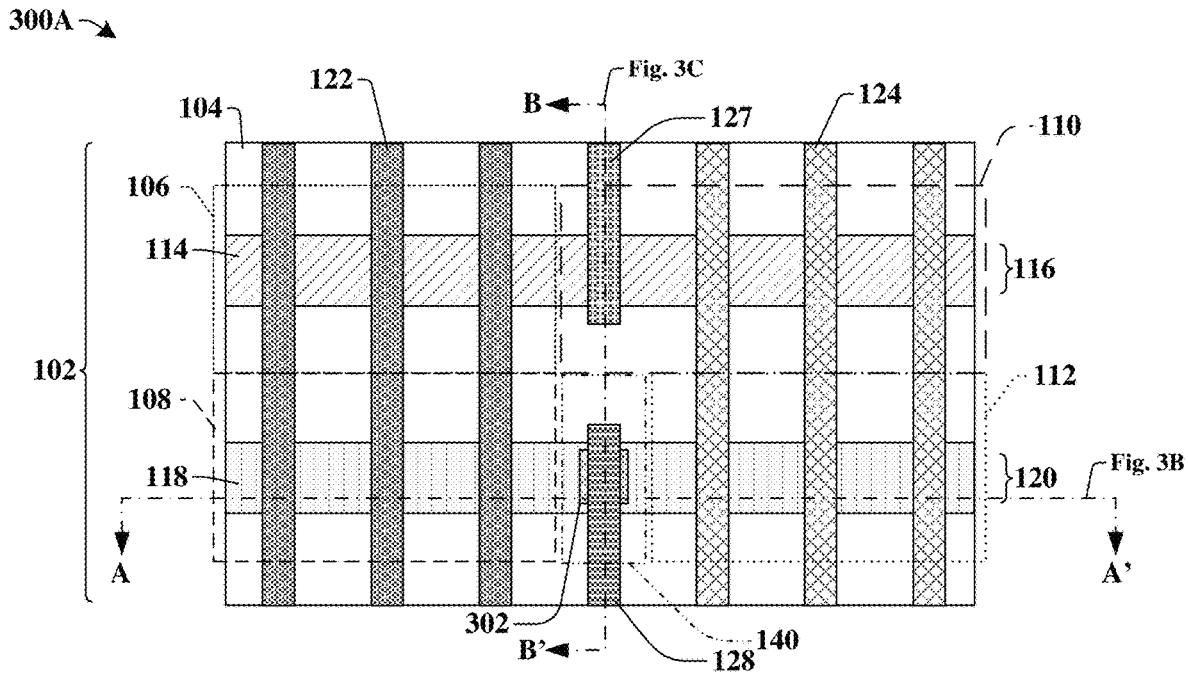
FIGS. 3A-C illustrate various views of some embodiments of an integrated chip comprising first and second continuous fins, wherein the second continuous fin has a higher doping concentration beneath a second dummy gate electrode than beneath first and second gate electrodes.

FIG. 3A illustrates a top-view 300A of some other embodiments of an integrated chip having a standard threshold voltage p-type device region 140 arranged between and having a higher threshold voltage than a low threshold voltage p-type device region 108 and an ultra-low threshold voltage p-type device region 112.

In some embodiments, the second dummy channel region of the second continuous fin 120 that underlies the second dummy gate electrode 128 is part of a first high doping concentration region 302 of the second continuous fin 120 and thus, has a higher doping concentration than the second and fourth channel regions of the second continuous fin 120 that underlie the first and second gate electrodes 122, 124, respectively. Thus, the standard threshold voltage p-type device region may have a higher threshold voltage than the low threshold voltage p-type device region 108 and the ultra-low threshold voltage p-type device region 112, thereby increasing the second dummy gate threshold voltage to turn the second dummy channel region "ON."

Figure 3B:
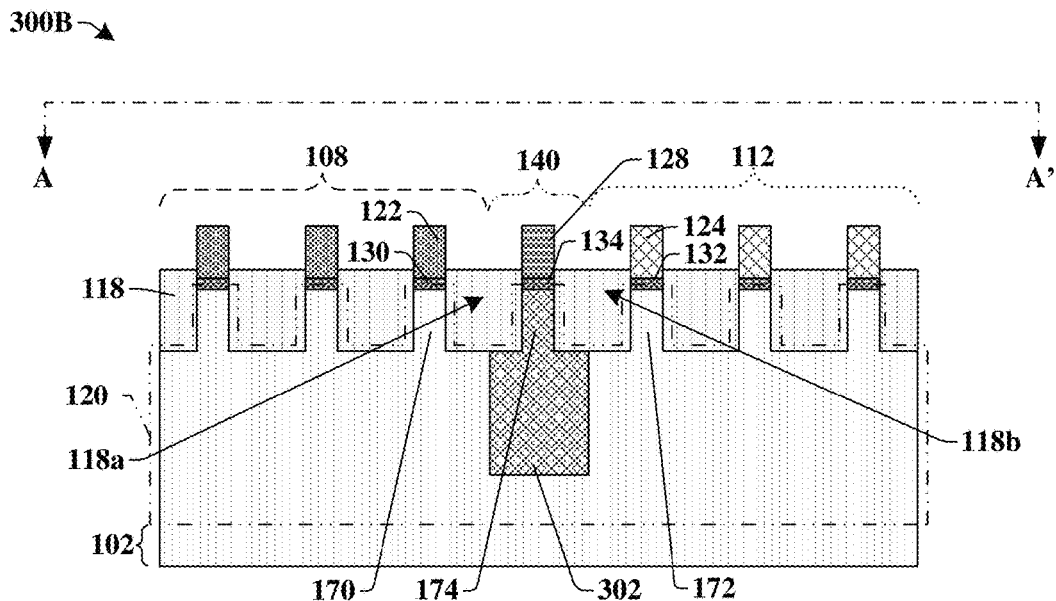

FIG. 3B illustrates a cross-sectional view 300B of some embodiments of an integrated chip corresponding to cross-section line AA' of the top-view 300A of FIG. 3A.

In some embodiments, the high doping concentration region 320 of the second continuous fin 120 comprises the second dummy channel region 174, wherein the first high doping concentration region 302 of the second continuous fin 120 has a higher doping concentration than other regions of the second continuous fin 120. In some embodiments, the first high doping concentration region 302 extends to a bottom surface of the substrate 102, whereas in other embodiments, the first high doping concentration region 302 does not extend into the substrate 102. Thus, in some embodiments, the second dummy channel region 174 has a higher doping concentration than the second and fourth channel regions 170, 172. For example, in some embodiments, the second continuous fin 120 has an n-type doping concentration and the second source/drain regions 118 have a p-type doping concentration. In such embodiments, the second dummy channel region 174 has a greater concentration of n-type dopants than the second and fourth channel regions 170, 172. The high doping concentration region 320 associated with the second dummy channel region 174 may cause the standard threshold voltage p-type device region 140 to have a greater threshold voltage than the low threshold voltage p-type device region 108 and the ultra-low threshold voltage p-type device region 112.

Figure 3C:
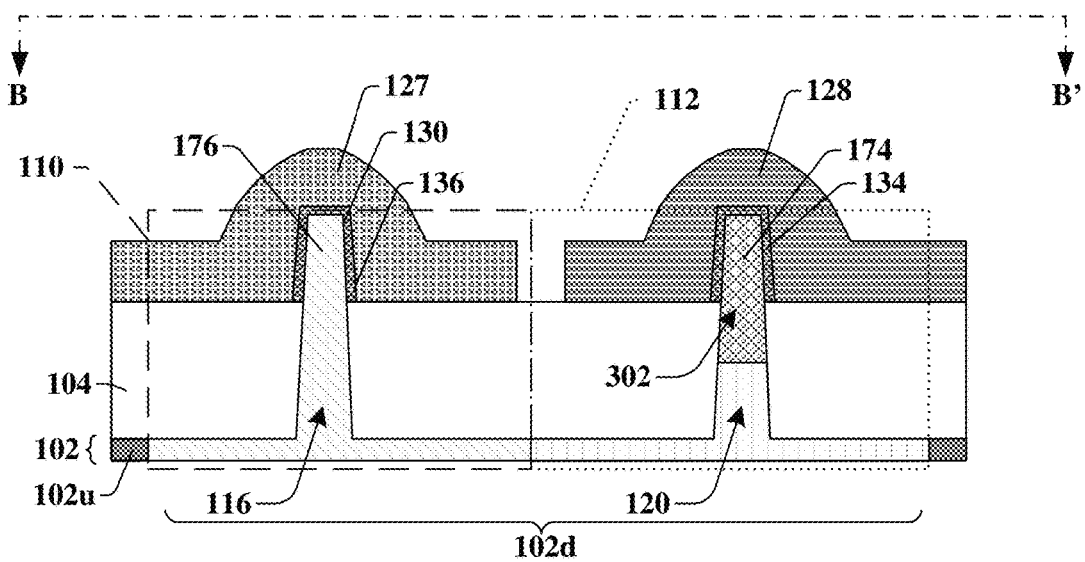

FIG. 3C illustrates a cross-sectional view 300C of some embodiments of an integrated chip corresponding to cross-section line BB' of the top-view 300A of FIG. 3A.

In some embodiments, the first dummy gate dielectric layer 136 and the second dummy gate dielectric layer 134 have approximately equal thicknesses and comprise a same material. Further in some embodiments, the first dummy gate electrode 127 and the second dummy gate electrode 128 comprise a same material. In some embodiments, the second dummy gate electrode 128 is arranged over a second continuous fin 120, and the second dummy channel region 174 has an increased doping concentration than a bottom of the second continuous fin 120. In some embodiments, the first continuous fin 116 may have a substantially equal doping concentration from the first dummy channel region 176 to a bottom of the first continuous fin 116.

Figure 4:
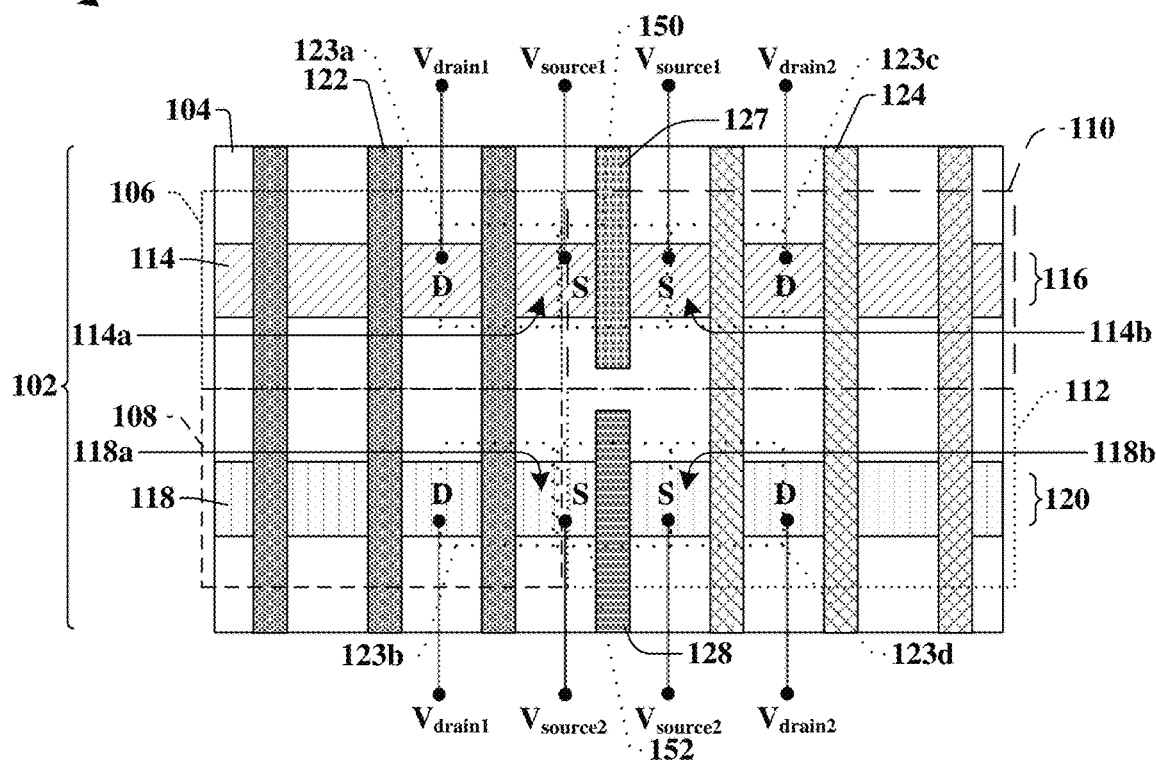
FIG. 4 illustrates a top-view of some embodiments of an integrated chip comprising a first dummy gate electrode between a first pair of source/drain regions coupled to first source terminals and comprising a second dummy gate electrode between a second pair of source/drain regions coupled to second source terminals.

FIG. 4 illustrates a top-view 400 of some embodiments of an integrated chip wherein the first and second ones 114a, 114b of the first source/drain regions 114 are coupled to the first source terminals $V_{source1}$, and wherein the first and second ones 118a, 118b of the second source/drain regions 118 are coupled to second source terminals $V_{source2}$.

In such embodiments, leakage between the first and third transistor devices 123a, 123c and leakage between the second and fourth transistor devices 123b, 123d are minimal. Thus, the first dummy gate electrode 127 and underlying features (e.g., first dummy gate dielectric layer, first dummy channel region, etc.) on the first continuous fin 116 may comprise a same structure as the first gate electrode 122 and underlying features (e.g., first gate dielectric layer, first channel region, etc.) on the first continuous fin 116 or a same structure as the second gate electrode 124 and underlying features (e.g., second gate dielectric layer, second channel region, etc.) on the first continuous fin 116. As illustrated in the top-view 400 of FIG. 4, the first dummy transistor device 150 has a same structure and threshold voltage as the third transistor device 123c, and thus, the ultra-low threshold voltage n-type device region 110 comprises the first dummy gate electrode 127 and the first dummy transistor device 150.

Further, in some embodiments, the second dummy gate electrode 128 and underlying features (e.g., second dummy gate dielectric layer, second dummy channel region, etc.) on the second continuous fin 120 may comprise a same structure as the first gate electrode 122 and underlying features (e.g., first gate dielectric layer, second channel region, etc.) on the second continuous fin 120 or a same structure as the second gate electrode 124 and underlying features (e.g., second gate dielectric layer, second channel region, etc.) on the second continuous fin 120. As illustrated in the top-view 400 of FIG. 4, the second dummy transistor device 152 has a same structure and threshold voltage as the fourth transistor device 123d, and thus, the ultra-low threshold voltage p-type device region 112 comprises the second dummy gate electrode 128 and the second dummy transistor device 152.

Figure 5:
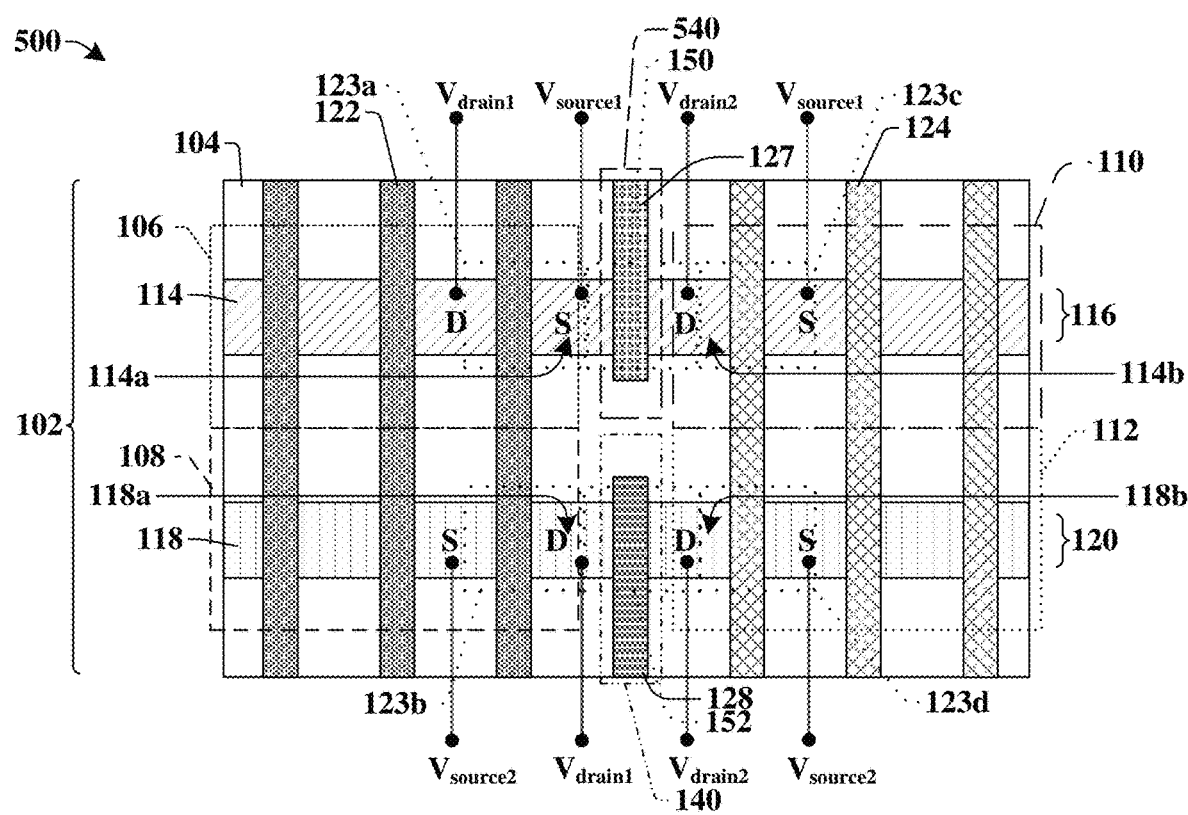
FIG. 5 illustrates a top-view of some embodiments of an integrated chip comprising a first dummy gate electrode between first and second ones of first source/drain regions coupled to at least one first drain terminal and comprising a second dummy gate electrode between first and second ones of second source/drain regions coupled to at least one second drain terminal.

FIG. 5 illustrates a top-view 500 of some embodiments of an integrated chip wherein at least one of the first or second ones 114a, 114b of the first source/drain regions 114 is coupled to a drain terminal (e.g., $V_{drain1}$, $V_{drain2}$) and wherein at least one of the first or second ones 118a, 118b of the second source/drain regions 118 is coupled to a drain terminal (e.g., $V_{drain1}$, $V_{drain2}$).

In such embodiments, leakage between the first and third transistor devices 123a, 123c and leakage between the second and fourth transistor devices 123b, 123d may occur. Thus, to mitigate such leakage, the first dummy gate electrode 127 and underlying features (e.g., first dummy gate dielectric layer, first dummy channel region, etc.) on the first continuous fin 116 may comprise a different structure than the first gate electrode 122 and underlying features (e.g., first gate dielectric layer, first channel region, etc.) on the first continuous fin 116 and a different structure than the second gate electrode 124 and underlying features (e.g., second gate dielectric layer, second channel region, etc.) on the first continuous fin 116. Thus, the first dummy transistor device 150 may have a higher threshold voltage than the first and third transistor devices 123a, 123c. Thus, a standard threshold voltage n-type device region 540 comprising the first dummy gate electrode 127 may be arranged between the low threshold voltage n-type device region 106 and the ultra-low threshold voltage n-type device region 110 to prevent leakage between the low threshold voltage n-type device region 106 and the ultra-low threshold voltage n-type device region 110.

Similarly, in such embodiments, the second dummy gate electrode 128 and underlying features (e.g., second dummy gate dielectric layer, second dummy channel region, etc.) on the second continuous fin 120 may comprise a different structure than the first gate electrode 122 and underlying features (e.g., first gate dielectric layer, second channel region, etc.) on the second continuous fin 120 and a different structure than the second gate electrode 124 and underlying features (e.g., second gate dielectric layer, second channel region, etc.) on the second continuous fin 120. Thus, the second dummy transistor device 152 may have a higher threshold voltage than the second and fourth transistor devices 123b, 123d. Thus, a standard threshold voltage p-type device region 140 comprising the second dummy gate electrode 128 may be arranged between the low threshold voltage p-type device region 108 and the ultra-low threshold voltage p-type device region 112 to prevent leakage between the low threshold voltage p-type device region 108 and the ultra-low threshold voltage p-type device region 112.

Figure 6:
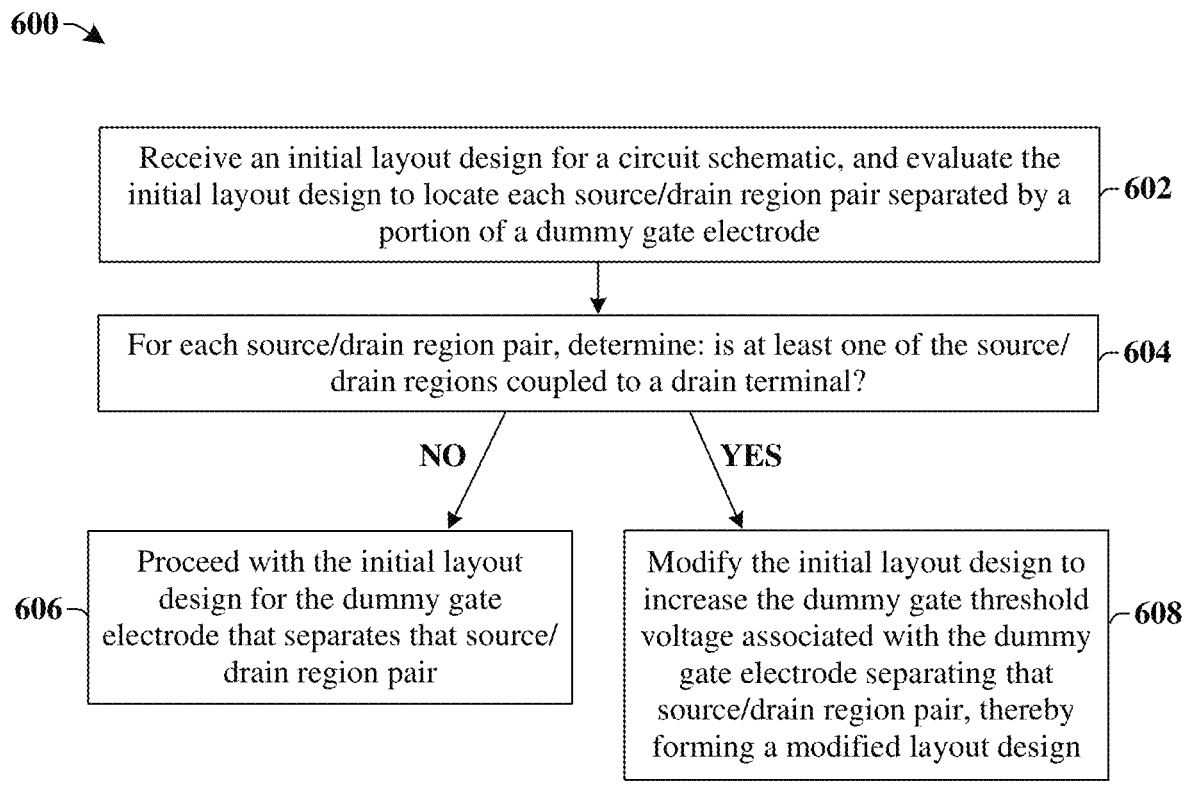
FIG. 6 illustrates a flow diagram of some embodiments of a method of determining if a layout design for a continuous fin device comprising a dummy gate electrode should be modified.

FIG. 6 illustrates a flow diagram of some embodiments of a method 600 of determining if a layout design for a continuous fin device comprising a dummy gate electrode should be modified to increase the dummy gate electrode threshold voltage associated with the dummy gate electrode. This method can be carried out by an auto-place and route tool, typically in the form of auto-place and route software executed on a computer system including a microprocessor and semiconductor memory.

At act 602, an initial layout design for a circuit schematic is received, and the initial layout is evaluated to locate each source/drain region pair separated by a portion of a dummy gate electrode.

At act 604, for each source/drain region pair, it is determined if at least one of the source/drain regions are coupled to a drain voltage terminal.

At act 606, if neither of the source/drain regions are coupled to a drain terminal, the method proceeds with the initial layout design for the portion of the dummy gate electrode that separates that source/drain region pair.

At act 608, if at least one of the source/drain regions are coupled to a drain terminal, the initial layout design is modified to increase the dummy gate threshold voltage associated with the dummy gate electrode separating that source/drain region pair, thereby forming a modified layout design.

FIGS. 7A-7D illustrate various views 700A-D of some embodiments corresponding to the method of FIG. 6.

Figure 7A:
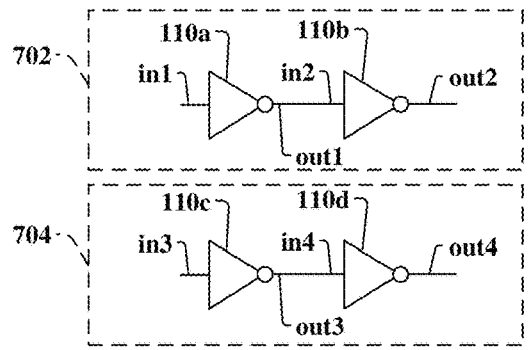
FIGS. 7A-7D illustrate various views of some embodiments of an integrated chip corresponding to the method of FIG. 6.

FIG. 7A illustrates a schematic view 700A of a first functional cell unit 702 and a second functional cell unit 704 of a semiconductor device. In this example, the first functional cell unit 702 comprises a first inverter 110a and a second inverter 110b, and the second functional cell unit 704 comprises a third inverter 110c and a fourth inverter 110d. The first inverter 110a includes a first input in1 and a first output out1, and the second inverter 110b includes to a second input in2 and a second output out2. In some embodiments, the first output out1 may be coupled to the second input in2. Similarly, in some embodiments, the third inverter 110c is includes a third input in3 and a third output out3, and the fourth inverter 110d includes a fourth input in4 and a second output out4. In some embodiments, the third output out3 may be coupled to the fourth input in4.

Figure 7B:
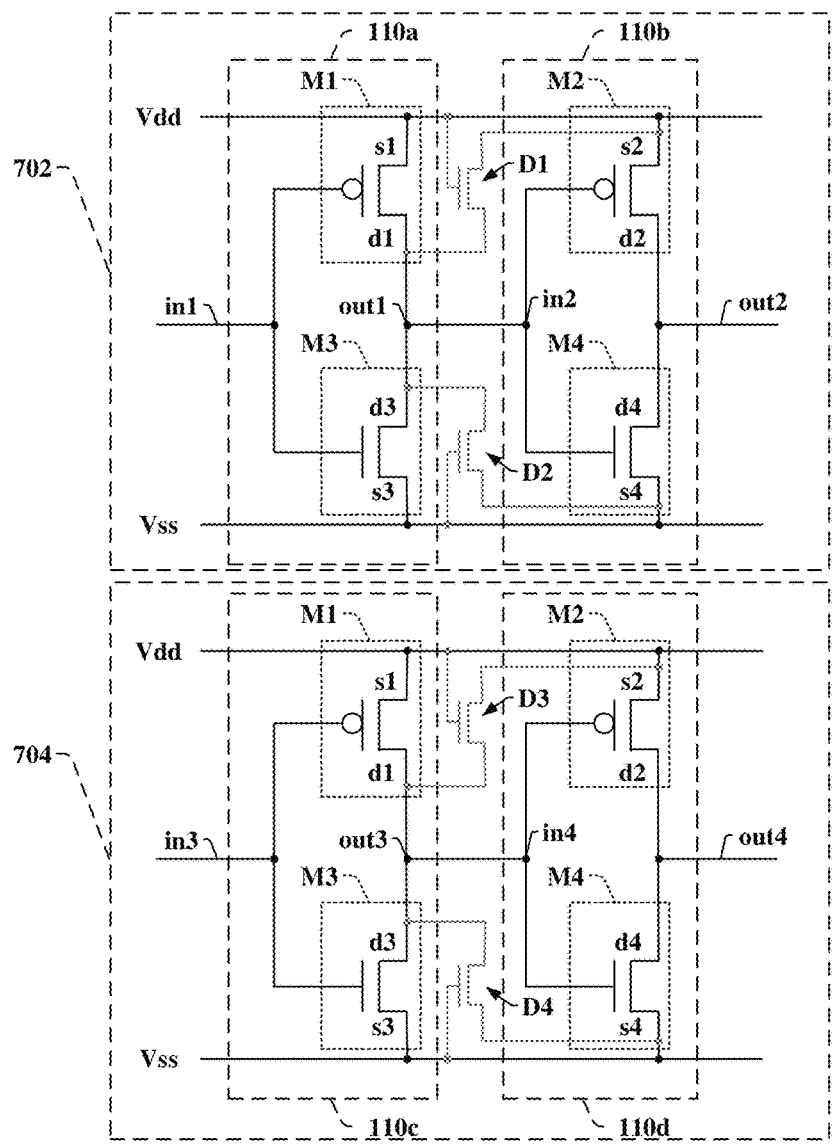

As shown in the transistor-level schematic view 700B of FIG. 7B, the first inverter 110a and the third inverter 110c each include a first p-type transistor M1 and a first n-type transistor M3. Gate electrodes of the first p-type transistor M1 and first n-type transistor M3 are coupled to an input terminal (e.g., the first input in1 for the first inverter 110a, the third input in3 for the third inverter 110c), and respective drain regions d1, d3 of the first p-type transistor M1 and first n-type transistor M3 are coupled to an output terminal (e.g., the first output out1 for the first inverter 110a, the third output out3 for the third inverter 110c). The second inverter 110b and the fourth inverter 110d each include a second p-type transistor M2 and a second n-type transistor M4. Gate electrodes of the second p-type transistor M2 and second n-type transistor M4 are coupled to an input terminal (e.g., the second input in2 for the second inverter 110b, the fourth input in4 for the fourth inverter 110d), and respective drain regions d2, d4 of the second p-type transistor M2 and second n-type transistor M4 are coupled to an output terminal (e.g., the second output out2 for the second inverter 110b, the fourth output out4 for the fourth inverter 110d). Dummy transistors D1, D2, D3, and D4 are also included. It will be appreciated that the term "dummy" as used herein, is to be understood as referring to a structure that is utilized to mimic the physical properties of other structure (e.g., a dummy transistor mimics the structural integrity of other nearby transistors), and which is parasitic, circuit inoperable, and/or not intentionally part of current flow in the final fabricated device. Thus, while the schematic view 700A in FIG. 7A includes inverters 110a-110d, the circuit schematic makes no explicit mention of dummy transistors D1-D4 illustrated in FIG. 7B. These dummy transistors D1-D4 are thus parasitic devices that are due manufacturing realities and are not intentionally present in the circuit schematic in the schematic view 700A of FIG. 7A.

Figure 7C:
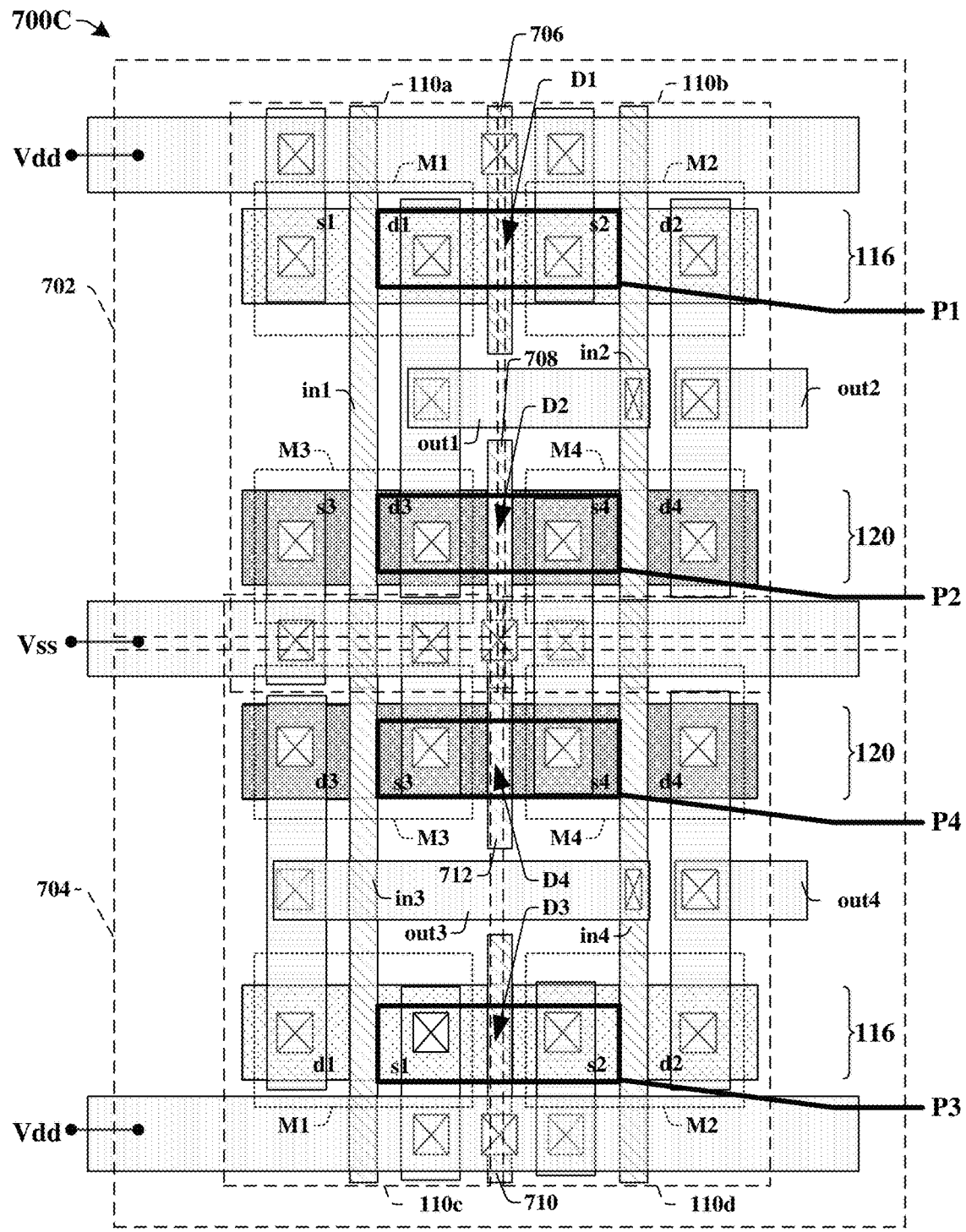

FIG. 7C illustrates an initial layout design 700C corresponding to the transistor-level schematic view 700B of FIG. 7B. The initial layout design 700C again includes a first inverter 110a made up of a first p-type transistor M1 and a first n-type transistor M3, and a second inverter 110b made up of a second p-type transistor M2 and a second n-type transistor M4. The first p-type transistor M1 and second p-type transistor M2 include p-type source/drain regions s1, d1, s2, d2, which may be disposed on a first continuous fin 116. The first n-type transistor M3 and second n-type transistor M4 include n-type source/drain regions s3, d3, s4, d4 which may be disposed on a second continuous fin 120 that is spaced apart from the first continuous fin 116. Thus, in some embodiments, p-type source/drain regions s1, d1, s2, d2 are arranged over the first continuous fin 116, wherein the first continuous fin 116 is n-type, and n-type source/drain regions s3, d3, s4, d4 are arranged over the second continuous fin 120, wherein the second continuous fin 120 is p-type. Although the first and second p-type transistors M1, M2 are arranged on the first continuous fin 116, the first p-type transistor M1 may have a different threshold voltage than the second p-type transistor M2. Similarly, although the first and second n-type transistors M3, M4 are arranged on the second continuous fin 120, the first n-type transistor M3 may have a different threshold voltage than the second n-type transistor M4.

First dummy transistor D1 is established in the first functional cell unit 702 when a dummy gate electrode 706 overlies the first continuous fin 116 between M1 and M2, but does not overlie the second continuous fin 120 of the first functional cell unit 702. Second dummy transistor D2 is established in the first functional cell unit 702 when a dummy gate electrode 708 overlies the second continuous fin 120 between M3 and M4, but does not overlie the first continuous fin 116 of the first functional cell unit 702. Third dummy transistor D3 is established in the second functional cell unit 704 when the dummy gate electrode 710 overlies the first continuous fin 116 between M1 and M2, but does not overlie the second continuous fin 120 of the second functional cell unit 704. Fourth dummy transistor D4 is established in the second functional cell unit 704 when a dummy gate electrode 712 overlies the second continuous fin 120 between M3 and M4, but does not overlie the first continuous fin 116 of the second functional cell unit 704.

As described in act 602 of FIG. 6, the initial layout design 700C of FIG. 7C may be evaluated to locate each source/drain region pair separated by a portion of a dummy gate electrode. Thus, in the initial layout design 700C of FIG. 7C, the first dummy gate transistor D1 has a dummy gate electrode 706 that separates a first source/drain region pair P1 comprising first drain region d1 and second source region s2. The second dummy gate transistor D2 has a dummy gate electrode 708 that separates a second source/drain region pair P2 comprising third drain region d3 and fourth source region s4. The third dummy gate transistor D3 has a dummy gate electrode 710 that separates a third source/drain region pair P3 comprising first source region s1 and second source region s2. The fourth dummy gate transistor D4 has a dummy gate electrode 712 that separates a fourth source/drain region pair P4 comprising third source region s3 and fourth source region s4. The first through fourth source regions s1-4 may be coupled to voltage sources ($V_{ss}$, $V_{dd}$), whereas the first through fourth drain regions d1-4 may be coupled to outputs (out1-4), otherwise known as drain terminals, in some embodiments.

When proceeding to act 604 of FIG. 6 for the first source/drain region pair P1 in the initial layout design 700C of FIG. 7C, it is determined that the first source/drain region pair P1 comprises at least one drain region (first drain region d1).

When proceeding to act 604 of FIG. 6 for the second source/drain region pair P2 in the initial layout design 700C of FIG. 7C, it is determined that the second source/drain region pair P2 comprises at least one drain region (third drain region d1).

When proceeding to act 604 of FIG. 6 for the third source/drain region pair P3 in the initial layout design 700C of FIG. 7C, it is determined that the third source/drain region pair P3 does not comprise at least one drain region.

When proceeding to act 604 of FIG. 6 for the fourth source/drain region pair P4 in the initial layout design 700C of FIG. 7C, it is determined that the fourth source/drain region pair P4 does not comprise at least one drain region.

Figure 7D:
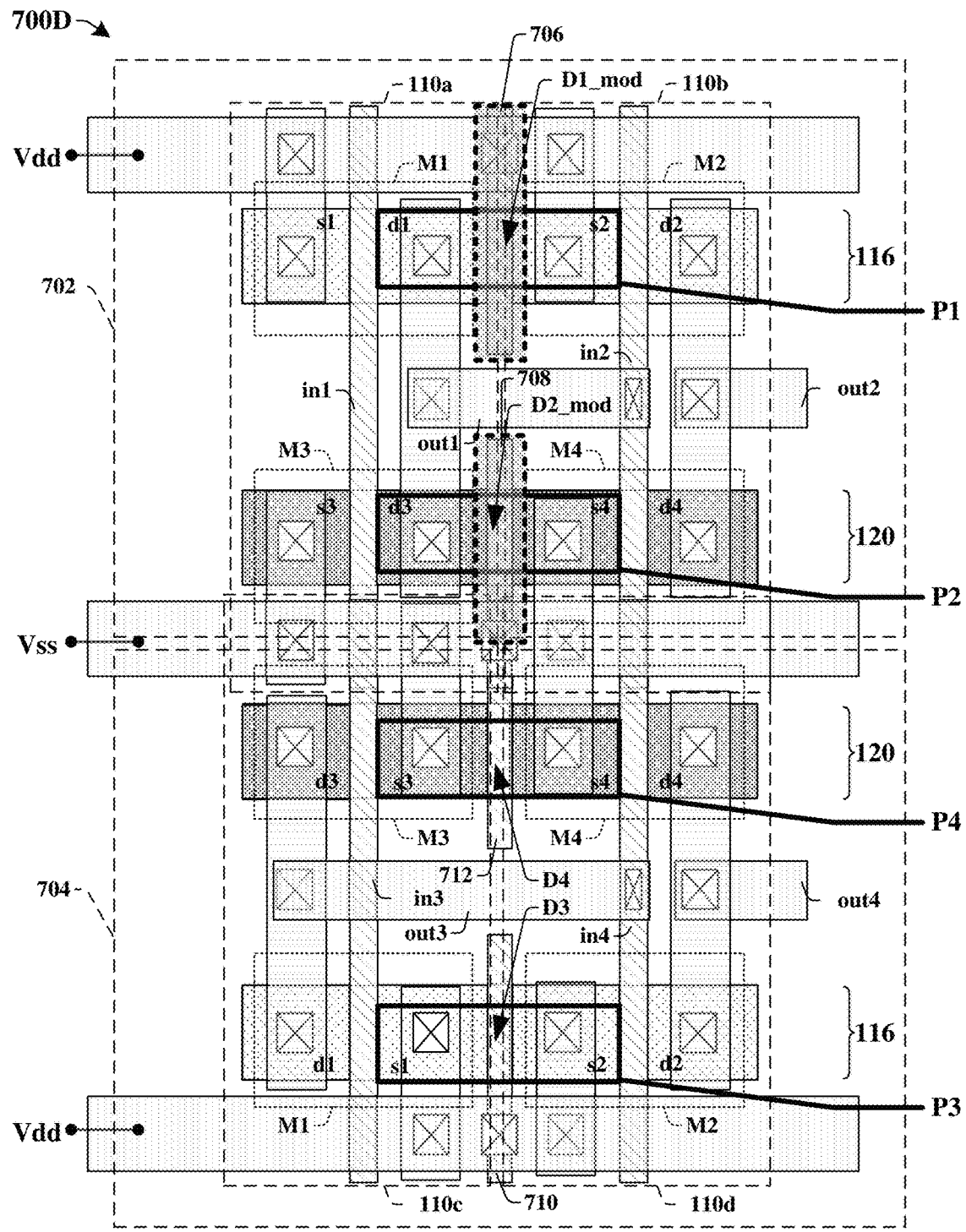

As illustrated in modified layout design 700D of FIG. 7D, act 608 of FIG. 6 is conducted on the first and second source/drain region pairs P1, P2, and act 606 of FIG. 6 is conducted on the third and fourth source/drain region pairs P3, P4.

According to act 606 of FIG. 6, the third and fourth dummy transistors D3, D4 are not modified. This is because the dummy gate electrodes 710, 712 of the third and fourth dummy transistors D3, D4 are between adjacent source regions, and thus, there is a low likelihood of leakage because the sources are at the same or similar voltage potential. Thus, the third dummy transistor D3 in the initial layout design 700C of FIG. 7C and the third dummy transistor D3 in the modified layout design 700D of FIG. 7D have a same structure, and thus, a same threshold voltage. Thus, the fourth dummy transistor D4 in the initial layout design 700C of FIG. 7C and the fourth dummy transistor D4 in the modified layout design 700D of FIG. 7D have a same structure and thus, a same threshold voltage.

According to act 608 of FIG. 6, a structure of the first dummy transistor D1 of FIG. 7C is modified to form a first modified dummy transistor D1_mod in the modified layout design 700D of FIG. 7D. This is because the first dummy transistor D1 is arranged between a source (s2) and a drain (d1), and these source and drain regions (s2, d1) have a higher likelihood of leakage because they are at different voltage potentials during operation. Therefore, the first modified dummy transistor D1_mod has a higher threshold voltage than the first dummy transistor D1 in the initial layout design 700C of FIG. 7C to help reduce the risk of current leakage in the modified layout design 700D of FIG. 7D. The first modified dummy transistor D1_mod may also have a higher threshold voltage than the first p-type transistor M1 and the second p-type transistor M2 in the first functional cell unit 702 to prevent leakage between the first p-type transistor M1 and the second p-type transistor M2.

Further, according to act 608 of FIG. 6, a structure of the second dummy transistor D2 of FIG. 7C is modified to form a second modified dummy transistor D2_mod in the modified layout design 700D of FIG. 7D. The second modified dummy transistor D2_mod has a higher threshold voltage than the second dummy transistor D2 in the initial layout design 700C of FIG. 7C to help reduce the risk of current leakage in the modified layout design 700D of FIG. 7D. The second modified dummy transistor D2_mod may also have a higher threshold voltage than the first n-type transistor M3 and the second n-type transistor M4 in the first functional cell unit 702 to prevent leakage between the first n-type transistor M3 and the second n-type transistor M4.

It will be appreciated that the first and second modified dummy transistors D1_mod, D2_mod may be formed by modifying their associated dummy gate electrode (706, 708), dummy gate dielectric layer, dummy channel region, and/or a combination thereof to increase their associated dummy threshold voltages required to turn "ON" (e.g., allow mobile charge carriers to travel through) their associated dummy channel region underlying their associated dummy gate electrode. For example, in some embodiments, the first modified dummy transistor D1_mod may be formed by modifying the doping concentration of the first continuous fin 116 underlying the dummy gate electrode 706 of the first modified dummy transistor D1_mod, whereas in other embodiments, the first modified dummy transistor D1_mod may be formed by adding a work function layer between the dummy gate electrode 706 of the first modified dummy transistor D1_mod and the dummy gate dielectric layer of the first modified dummy transistor D1_mod. The work function layer may comprise a different material than the dummy gate electrode 706 of the first modified dummy transistor D1_mod, and thus, influence the dummy threshold voltage of the first modified dummy transistor D1_mod.

The modified layout design 700D of FIG. 7D has a same surface area on the integrated chip as the initial layout design 700C of FIG. 7C. Thus, mitigating the leakage between transistors having different threshold voltages may be achieved by modifying dummy transistors to increase dummy threshold voltages without increasing the surface area of the integrated chip.

FIGS. 8, 9A-C, and 10 respectively illustrate perspective views 800, 900A-C, and 1000 of some embodiments of a method of modifying the initial layout design 700C of FIG. 7C to form the modified layout design 700D of FIG. 7D by increasing a first dummy threshold voltage associated with a first dummy gate electrode by modifying the material(s) of the first dummy gate electrode. Although FIGS. 8, 9A-C, and 10 are described in relation to a method, it will be appreciated that the structures disclosed in FIGS. 8, 9A-C, and 10 are not limited to such a method, but instead may stand alone as structures independent of the method.

Figure 8:
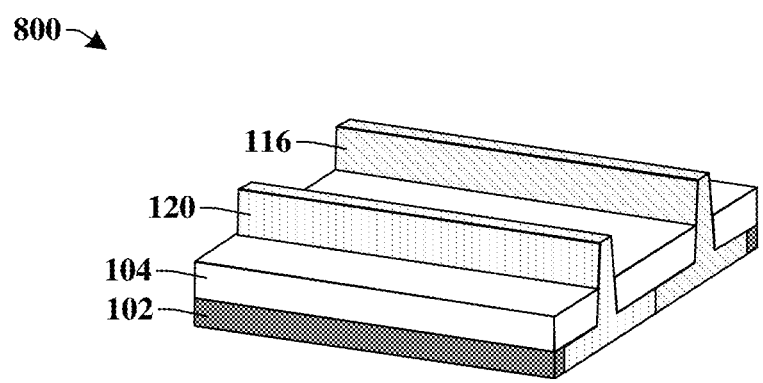

As shown in perspective view 800 of FIG. 8, a first continuous fin 116 and a second continuous fin 120 may be formed over a substrate 102. The first and second continuous fins 116, 120 are formed from the substrate 102, and thus, the first continuous fin 116, the second continuous fin 120, and the substrate 102 may comprise a same semiconductor material, such as, for example silicon, germanium, or the like, for example. In some embodiments, the first continuous fin 116, the second continuous fin 120 may comprise different doping types and/or different doping concentrations from one another.

To form the first and second continuous fins 116, 120, the substrate 102 may be doped via, for example, ion implantation. In such embodiments, the substrate 102 may be selectively doped such that when the first continuous fin 116 is formed, it is p-type, and when the second continuous fin 120 is formed, it is n-type. After the substrate 102 is doped, portions of the substrate 102 may be removed to form and define a first continuous fin 116 and a second continuous fin 120 protruding from a substrate 102 through photolithography and removal (e.g., etching) processes. An isolation structure 104 may be formed to surround portions of the first and second continuous fins 116, 120 and to cover the substrate 102. In some embodiments, the isolation structure 104 comprises a dielectric material, such as, for example, nitride (e.g., silicon nitride, silicon oxynitride), a carbide (e.g., silicon carbide), an oxide (e.g., silicon oxide), borosilicate glass (BSG), phosphoric silicate glass (PSG), borophosphosilicate glass (BPSG), a low-k oxide (e.g., a carbon doped oxide, SiCOH), or the like.

Figure 9A:
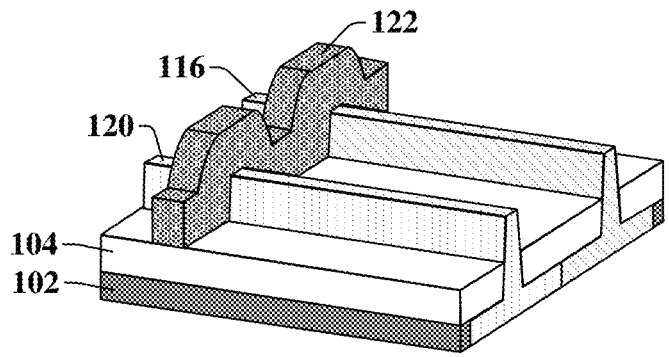

As shown in perspective view 900A of FIG. 9A, in some embodiments, a first gate electrode 122 may be formed over the first and second continuous fins 116, 120. Other portions of the isolation structure 104 and the first and second continuous fins 116, 120 may be covered by a mask such that the first gate electrode 122 may be selectively formed through a deposition process (e.g., physical vapor deposition (PVD), chemical vapor deposition (CVD), PE-CVD, atomic layer deposition (ALD), sputtering, etc.). In some embodiments, the first gate electrode 122 may comprise a first conductive material, such as, for example, aluminum, ruthenium, palladium, tantalum, titanium, or the like. Further, in some embodiments, prior to the formation of the first gate electrode 122, a first gate dielectric layer (130 of FIG. 1A) may be selectively formed over the first and second continuous fins 116, 120. In some embodiments, the first gate dielectric layer (130 of FIG. 1C) may have a first thickness $t_1$ and comprise a high-k dielectric, such as, for example, aluminum oxide, hafnium oxide, or the like. In other embodiments, the first gate electrode 122 may comprise polysilicon, and the first gate dielectric layer (130 of FIG. 1A) may comprise silicon dioxide, for example.

Figure 9B:
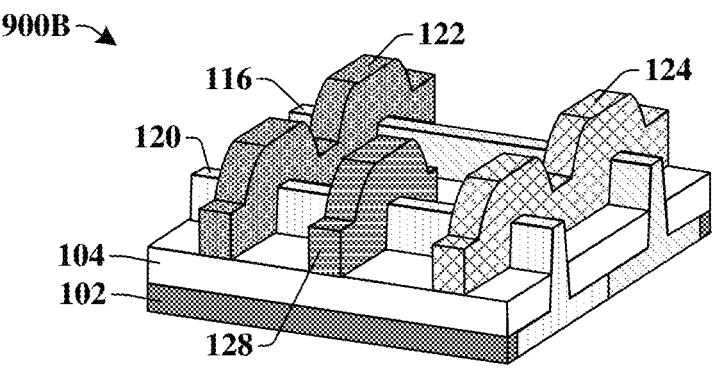

As shown in perspective view 900B of FIG. 9B, in some embodiments, a second gate electrode 124 may be formed over the first and second continuous fins 116, 120, and a second dummy gate electrode 128 may be formed over the second continuous fin 120. In such embodiments, the second gate electrode 124 and the second dummy gate electrode 128 may respectively comprise a second material and a third material, wherein the second and third materials are the same. Because the second gate electrode 124 and the second dummy gate electrode 128 comprise a same material, they may be formed at a same time. Further, a second gate dielectric layer (132 of FIG. 1A) and a second dummy gate dielectric layer (134 of FIG. 1A) may be formed over the first and/or second continuous fins 116, 120 prior to the formation of the second gate electrode 124 and the second dummy gate electrode 128.

In some embodiments, the second material of the second gate electrode 124 and the third material of the second dummy gate electrode 128 may be different than the first material of the first gate electrode 122, because in some embodiments, the second gate electrode 124 and the second dummy gate electrode 128 arranged over the second continuous fin 120 are associated with a different threshold voltage than a threshold voltage associated with the first gate electrode 122 arranged over the second continuous fin 120. In some embodiments, the second gate electrode 124 and the second dummy gate electrode 128 may comprise a conductive material, such as, for example, aluminum, ruthenium, palladium, tantalum, titanium, or the like.

In some embodiments, the second gate dielectric layer (132 of FIG. 1C) and the second dummy gate dielectric layer (134 of FIG. 1C) may respectively have a second thickness ($t_2$ of FIG. 1C) and a third thickness ($t_3$ of FIG. 1C). In the perspective view 900B of FIG. 9B, because the second gate electrode 124 arranged over the second continuous fin 120 is associated with a same threshold voltage as the second dummy gate electrode 128 arranged over the second continuous fin 120, the second thickness ($t_2$ of FIG. 1C) may be about equal to the third thickness ($t_3$ of FIG. 1C). In some embodiments, the second gate dielectric layer (132 of FIG. 1A) and the second dummy gate dielectric layer (134 of FIG. 1A) may comprise a same high-k dielectric material, such as, for example, aluminum oxide, hafnium oxide, or the like. In other embodiments, the second gate electrode 124 and the second dummy gate electrode 128 may comprise polysilicon, and the second gate dielectric layer (132 of FIG. 1A) and the second dummy gate dielectric layer (134 of FIG. 1A) may comprise silicon dioxide, for example.

Figure 9C:
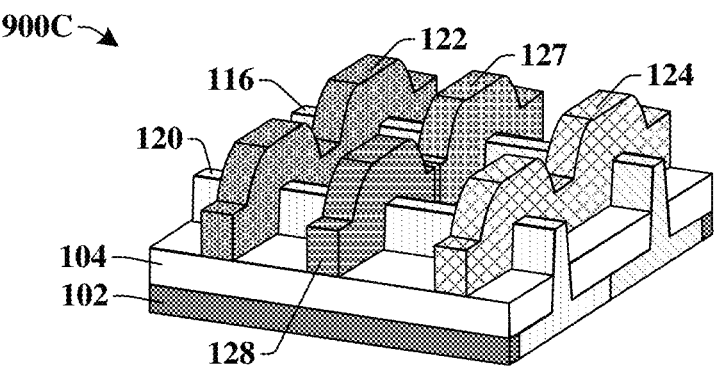

As illustrated in perspective view 900C of FIG. 9C, in some embodiments, a first dummy gate electrode 127 may be formed over the first continuous fin 116. In such embodiments, the first dummy gate electrode 127 may respectively comprise a fourth material. In some embodiments, the fourth material of the first dummy gate electrode 127 may be different than the first material, the second material, and the third material of the first gate electrode 122, the second gate electrode 124 and the second dummy gate electrode 128, respectively. Thus, the first dummy gate electrode 127 may comprise a different material than the first and second gate electrodes 122, 124 so that the first dummy gate electrode 127 is associated with a higher threshold voltage than threshold voltages associated with the first and second gate electrodes 122, 124 arranged over the first continuous fin 116. In some embodiments, for example, the first dummy gate electrode 127 may comprise more than one conductive layer, wherein at least one of the conductive layers comprises the fourth material. Further, a first dummy gate dielectric layer (136 of FIG. 1D) may be formed over the first continuous fin 116 prior to the formation of the first dummy gate electrode 127. In some embodiments, each of the first gate electrode 122, the second gate electrode 124, the first dummy gate electrode 127, and the second dummy gate electrode 128 may have a thickness in a range of between, for example, approximately 1 nanometer and approximately 6 nanometers. In some embodiments, the first gate electrode 122, the second gate electrode 124, the first dummy gate electrode 127, and/or the second dummy gate electrode 128 do not have the same thicknesses.

Thus, a standard threshold voltage n-type device region (540 of FIG. 5) comprising the first dummy gate electrode 127 may be formed by selectively forming the first dummy gate electrode 127 on the first continuous fin 116, wherein the first dummy gate electrode 127 comprises a different material than the first gate electrode 122, the second gate electrode 124, and the second dummy gate electrode 128 as illustrated in perspective views 900A-9C of FIGS. 9A-9C.

As illustrated in perspective view 1000 of FIG. 10, in some embodiments, first source/drain regions 114 may be formed over portions of the first continuous fin 116 that do not underlie the first gate electrode 122, the second gate electrode 124, or the first dummy gate electrode 127. In some embodiments, second source/drain regions 118 may be formed over portions of the second continuous fin 120 that do not underlie the first gate electrode 122, the second gate electrode 124, or the second dummy gate electrode 128. In some embodiments, the first and second source/drain regions 114, 118 may be formed by removing upper portions of the first and second continuous fins 116, 120, respectively, and epitaxially growing the respective first and second source/drain regions 114, 118. In other embodiments, the first and second source/drain regions 114, 118 may be formed by doping the first and second continuous fins 116, 120 uncovered by the first gate electrode 122, the second gate electrode 122, the first dummy gate electrode 127, and/or the second dummy gate electrode 128. The first source/drain regions 114 have an opposite doping type than the first continuous fin 116. For example, in some embodiments, the first continuous fin 116 is p-type, and thus, the first source/drain regions 114 are formed as n-type. Similarly, the second source/drain regions 118 have an opposite doping type than the second continuous fin 120. For example, in some embodiments, the second continuous fin 120 is n-type, and thus, the second source/drain regions 118 are formed as p-type.

FIG. 11 illustrates a flow diagram of some embodiments of a method 1100 corresponding to FIGS. 8, 9A-C, and 10.

While method 1100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 1102, a first continuous fin that protrudes from a substrate having a first doping type is formed. FIG. 8 illustrates a perspective view 800 of some embodiments corresponding to act 1102.

At act 1104, a first gate electrode having a first material is formed over the first continuous fin. FIG. 9A illustrates a perspective view 900A of some embodiments corresponding to act 1104.

At act 1106, a second gate electrode having a second material is formed over the first continuous fin, wherein the second material is different from the first material of the first gate electrode. FIG. 9B illustrates a perspective view 900B of some embodiments corresponding to act 1106.

At act 1108, a first dummy gate electrode is formed between the first and second gate electrodes, wherein the first dummy gate electrode comprises a fourth material different than the first and second materials, and wherein the first dummy gate electrode is associated with a higher threshold voltage than threshold voltages associated with the first and second gate electrodes. FIG. 9C illustrates a perspective view 900C of some embodiments corresponding to act 1108.

At act 1110, source/drain regions having a second doping type are formed over the first continuous fin and between the first, second, and first dummy gate electrodes. FIG. 10 illustrates a perspective view 1000 of some embodiments corresponding to act 1110.

FIGS. 12, 13A-C, 14A, 14B, and 15 respectively illustrate perspective views 1200, 1300A-C, 1400A, 1400B, and 1500 of some other embodiments of a method of modifying the initial layout design 700C of FIG. 7C to form the modified layout design 700D of FIG. 7D by increasing a first dummy threshold voltage associated with a first dummy gate electrode by increasing the doping concentration of a first dummy channel region underlying the first dummy gate electrode. Although FIGS. 12, 13A-C, 14A, 14B, and 15 are described in relation to a method, it will be appreciated that the structures disclosed in FIGS. 12, 13A-C, 14A, 14B, and 15 are not limited to such a method, but instead may stand alone as structures independent of the method.

Figure 12:
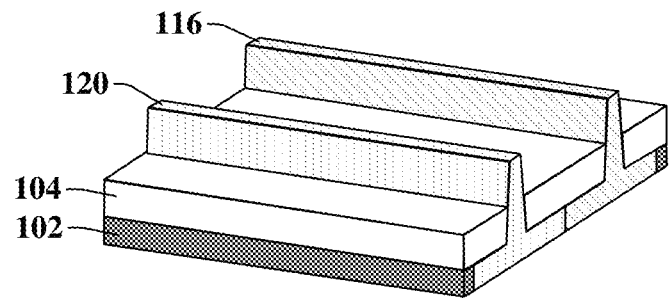

As illustrated in perspective view 1200 of FIG. 12, in some embodiments, a first continuous fin 116, a second continuous fin 120, and an isolation structure 104 may be formed over a substrate 102 as described with respect to FIG. 8.

Figure 13A:
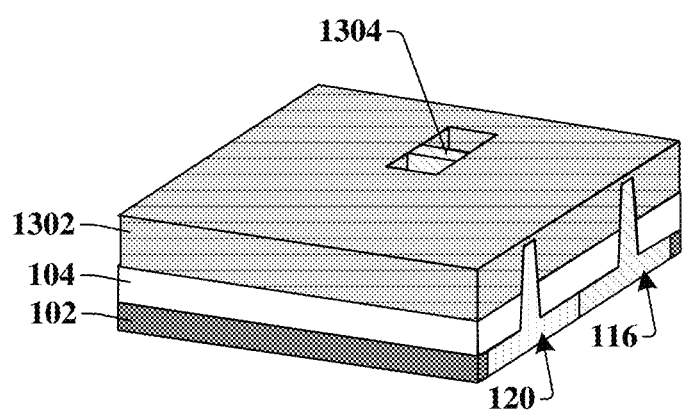

As illustrated in perspective view 1300A of FIG. 13A, in some embodiments, a first masking structure 1302 may be formed over the first and second continuous fins 116, 120. The first masking structure 1302 may be patterned through patterning (e.g., photolithography) and removal (e.g., etching) processes to expose a first portion 1304 of the first continuous fin 116, wherein the first portions 1304 of the first continuous fin 116 corresponds to where a first dummy gate electrode (127 of FIG. 7B) will overlie the first continuous fin 116.

Figure 13B:
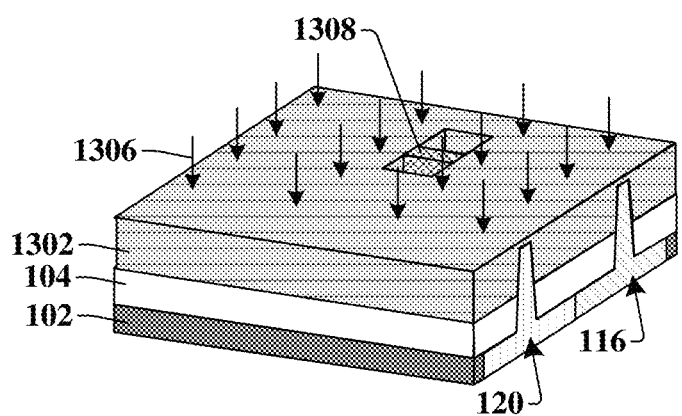

As illustrated in perspective view 1300B of FIG. 13B, in some embodiments, a doping process 1306 may be conducted such that a second high doping concentration region 1308 is formed on the first portion (1304 of FIG. 13A) of the first continuous fin 116. The doping process 1306 may be an ion implantation process in some embodiments. The first masking structure 1302 may protect the rest of the first and second continuous fins 116, 120 from the doping process 1306.

Figure 13C:
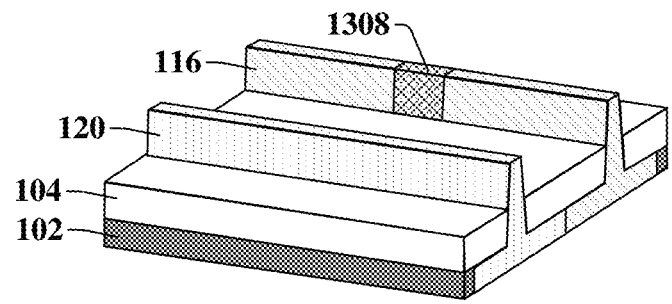

As illustrated in perspective view 1300C of FIG. 13C, in some embodiments, the first masking structure (1302 of FIG. 13B) is removed. In some embodiments, the first masking structure (1302 of FIG. 13B) is a photoresist material, and thus, the first masking structure (1302 of FIG. 13B) is removed by stripping. The first continuous fin 116 comprises the second high doping concentration region 1308 which, in some embodiments, has a higher doping concentration than surrounding portions of the first continuous fin 116. In some embodiments, the second high doping concentration region 1308 and surrounding portions of the first continuous fin 116 may comprise a same, first doping type.

It will be appreciated that in other embodiments, the second high doping concentration region 1308 of the first continuous fin 116 may be formed prior to the formation of the first continuous fin 116. In such embodiments, the doping process (1306 of FIG. 13B) may be conducted on the substrate 102 prior to the formation of the first continuous fin 116, for example.

Figure 14A:
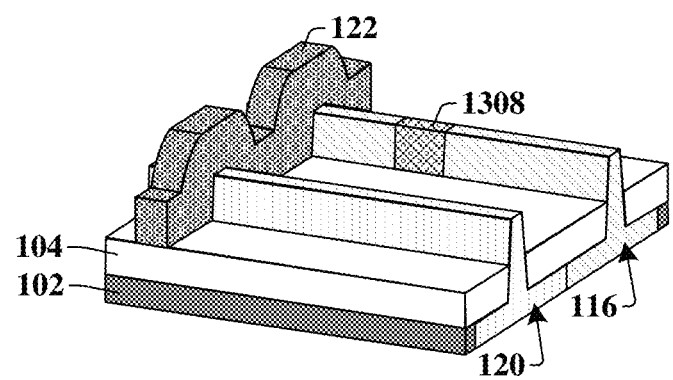

As illustrated in perspective view 1400A of FIG. 14A, in some embodiments, a first gate electrode 122 may be deposited over the first and second continuous fins 116, 120, for example, as described with respect to FIG. 9A.

Figure 14B:
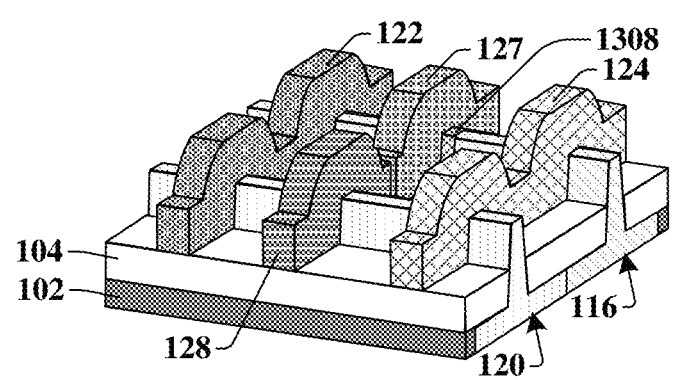

As illustrated in perspective view 1400B of FIG. 14B, in some embodiments, a second gate electrode 124, a first dummy gate electrode 127, and a second dummy gate electrode 128 may be formed over the first and second continuous fins 116, 120. In some embodiments, the second gate electrode 124, the first dummy gate electrode 127, and the second dummy gate electrode 128 may comprise a same, conductive material, such as, for example, aluminum, ruthenium, palladium, tantalum, titanium, or the like. Further, in some embodiments, the second gate electrode 124, the first dummy gate electrode 127, and a second dummy gate electrode 128 may comprise a different material than the first gate electrode 122.

Thus, a standard threshold voltage n-type device region (540 of FIG. 5) comprising the first dummy gate electrode 127 may be formed by selectively doping the first portion (1304 of FIG. 13A) of the first continuous fin 116, wherein the first dummy gate electrode 127 is arranged over a second high doping concentration region 1308 of the first continuous fin 116 and is associated with a higher threshold voltage than threshold voltages associated with the first and second gate electrodes 122, 124 arranged over the first continuous fin 116.

As illustrated in perspective view 1500 of FIG. 15, in some embodiments, first source/drain regions 114 may be formed over portions of the first continuous fin 116 that do not underlie the first gate electrode 122, the second gate electrode 124, or the first dummy gate electrode 127. In some embodiments, second source/drain regions 118 may be formed over portions of the second continuous fin 120 that do not underlie the first gate electrode 122, the second gate electrode 124, or the second dummy gate electrode 128. The first and second source/drain regions 114, 118 may be formed using the methods as described in FIG. 10, in some embodiments.

FIG. 16 illustrates a flow diagram of some embodiments of a method 1600 corresponding to FIGS. 12, 13A-C, 14A, 14B, and 15.

While method 1600 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 1602, a first continuous fin may be formed that protrudes from a substrate having a first doping type. FIG. 12 illustrates a perspective view 1200 of some embodiments corresponding to act 1602.

At act 1604, a first portion of the first continuous fin is selectively doped to increase the doping concentration of the first portion of the first continuous fin. FIGS. 13A-C illustrate perspective views 1300A-C of some embodiments corresponding to act 1604.

At act 1606, a first gate electrode associated with a first threshold voltage is formed over the first continuous fin. FIG. 14A illustrates a perspective view 1400A of some embodiments corresponding to act 1606.

At act 1608, a second gate electrode and a first dummy gate electrode are formed over the first continuous fin, wherein the second gate electrode is associated with a second threshold voltage that is different than the first threshold voltage, and wherein the first dummy gate electrode is associated with a first dummy gate threshold voltage that is greater than the first and second threshold voltages. FIG. 14B illustrates a perspective view 1400B of some embodiments corresponding to act 1608.

At act 1610, source/drain regions are formed over the first continuous fin and between the first gate electrode, the second gate electrode, and the first dummy gate electrode, wherein the source/drain regions have a second doping type. FIG. 15 illustrates a perspective view 1500 of some embodiments corresponding to act 1610.

Thus, the present disclosure relates to a structure and a corresponding method of forming an integrated chip comprising a first dummy gate electrode arranged over a first continuous fin and between a first transistor device having a first threshold voltage and a third transistor device having a third threshold voltage different than the first threshold voltage, wherein a first dummy threshold voltage associated with the first dummy gate electrode is increased to be greater than the first and third dummy threshold voltages if at least one source/drain region directly beside the first dummy gate electrode is coupled to a drain terminal.

Accordingly, in some embodiments, the present disclosure relates to a method comprising: receiving an initial layout design for a circuit schematic, the initial layout design including a first gate electrode, a second gate electrode, and a dummy gate electrode arranged over a continuous fin, wherein the dummy gate electrode is arranged between the first and second gate electrodes, wherein a first source/drain region is arranged between the first gate electrode and the dummy gate electrode, and a second source/drain region is arranged between the second gate electrode and the dummy gate electrode, wherein the first gate electrode corresponds to a first transistor having a first threshold voltage, the second gate electrode corresponds to a second transistor having a second threshold voltage, and the dummy gate electrode corresponds to a dummy transistor having a dummy threshold voltage and separating the first transistor and the second transistor; determining if at least one of the first or second source/drain regions corresponds to a drain in the circuit schematic; and modifying the initial layout design to increase the dummy threshold voltage of the dummy transistor to a modified dummy threshold voltage when the at least one of the first or second source/drain regions corresponds to the drain in the circuit schematic, thereby providing a modified layout design, wherein the dummy transistor has a modified dummy threshold voltage that is higher than the each of the first threshold voltage and the second threshold voltage.

In other embodiments, the present disclosure relates to a multi-transistor device, comprising: a continuous fin protruding from a substrate, the continuous fin extending in a first direction: a first transistor device having a first threshold voltage and comprising: a first gate electrode extending in a second direction substantially perpendicular to the first direction, wherein the first gate electrode directly overlies a first channel region of the continuous fin, and a first source/drain region and a second source/drain region of the continuous fin, wherein the first gate electrode separates the first source/drain region from the second source/drain region; a second transistor device having a second threshold voltage that is different than the first threshold voltage, the second transistor device comprising: a second gate electrode extending in the second direction and directly overlying a second channel region of the continuous fin, and a third source/drain region and a fourth source/drain region of the continuous fin, wherein the second gate electrode separates the third source/drain region from the fourth source/drain region; and a dummy transistor device having a dummy gate threshold voltage and comprising: a dummy gate electrode extending in the second direction and directly overlying a dummy channel region of the continuous fin, wherein the dummy gate electrode is directly between the second source/drain region and the third source/drain region, and wherein the dummy gate threshold voltage is greater than the first and second threshold voltages.

In yet other embodiments, the present disclosure relates to an integrated chip, comprising: a first continuous fin arranged over a substrate and extending in a first direction; a second continuous fin arranged over the substrate, extending in the first direction, and spaced apart from the first continuous fin in a second direction substantially perpendicular to the first direction; a first gate electrode extending in the second direction and arranged over a first channel region of the first continuous fin to define a first transistor device and a second channel region of the second continuous fin to define a second transistor device; a second gate electrode extending in the second direction and arranged over a third channel region of the first continuous fin to define a third transistor device and a fourth channel region of the second continuous fin to define a fourth transistor device; a first dummy gate electrode arranged between the first and second gate electrodes and arranged over a first dummy channel region of the first continuous fin to define a first dummy transistor device, wherein the first dummy transistor device shares a first source/drain region with the first transistor device, and wherein the first dummy transistor device shares a second source/drain region with the third transistor device; and a second dummy gate electrode arranged between the first and second gate electrodes and arranged over a second dummy channel region of the second continuous fin, to define a second dummy transistor device, wherein the second dummy gate electrode is spaced apart from the first dummy gate electrode in the second direction, wherein the second dummy transistor device shares a third source/drain region with the second transistor device, and wherein the second dummy transistor device shares a fourth source/drain region with the fourth transistor device, and wherein the first transistor device has a different threshold voltage than the third transistor device, and wherein the first dummy transistor device has a higher threshold voltage than the first and third transistor devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   removing portions of a substrate to form a continuous fin protruding from an upper surface of the substrate, wherein the continuous fin has a first dopant concentration;
   performing a doping process to selectively increase a dopant concentration of a first portion of the continuous fin such that the first portion of the continuous fin has a second dopant concentration that is greater than the first dopant concentration;
   forming a first gate electrode over a second portion of the continuous fin;
   forming a second gate electrode over a third portion of the continuous fin, wherein the first portion of the continuous fin is between the second portion and the third portion of the continuous fin;
   forming a dummy gate electrode over the first portion of the continuous fin;
   removing upper portions of the continuous fin that are arranged between the first gate electrode, the second gate electrode, and the dummy gate electrode; and
   forming source/drain regions between the first gate electrode, the second gate electrode, and the dummy gate electrode.

2. The method of claim 1, wherein the first gate electrode comprises a same material as the second gate electrode and the dummy gate electrode.

3. The method of claim 1, wherein the first gate electrode comprises a different material than the second gate electrode and the dummy gate electrode.

4. The method of claim 1, wherein the first portion of the continuous fin has a same dopant type as the second portion and the third portion of the continuous fin.

5. The method of claim 1 further comprising:
   forming a masking structure over the substrate and the continuous fin to expose the first portion of the continuous fin prior to the performing of the doping process; and
   removing the masking structure after the performing of the doping process.

6. The method of claim 1, wherein the dummy gate electrode corresponds to a dummy transistor having a dummy threshold voltage, wherein the first gate electrode corresponds to a first transistor having a first threshold voltage, wherein the second gate electrode corresponds to a second transistor having a second threshold voltage, wherein the dummy threshold voltage is greater than the first threshold voltage and the second threshold voltage.

7. The method of claim 6, wherein the first threshold voltage is different than the second threshold voltage.

8. A method, comprising:
   forming a fin of semiconductor material extending outward from an upper surface of a substrate;
   forming a first gate electrode over the fin, the first gate electrode being separated from the fin by a first gate dielectric;
   forming a second gate electrode over the fin, the second gate electrode being separated from the fin by a second gate dielectric; and
   forming a third gate electrode over the fin and laterally between the first gate electrode and the second gate electrode, the third gate electrode being separated from the fin by a third gate dielectric that has a larger thickness than the first gate dielectric and the second gate dielectric.

9. The method of claim 8, further comprising:
   forming a second fin of semiconductor material extending outward from the upper surface of the substrate, wherein the first gate electrode and the third gate electrode continuously extend from over the fin to over the second fin; and
   forming a fourth gate electrode over the second fin and laterally between the first gate electrode and the second gate electrode, the fourth gate electrode being separated from the second fin by a fourth gate dielectric that has a larger thickness than the first gate dielectric and the second gate dielectric.

10. The method of claim 9, wherein an outermost sidewall of the third gate electrode is separated from an outermost sidewall of the fourth gate electrode.

11. The method of claim 8, wherein the first gate electrode corresponds to a first transistor device having a first threshold voltage and the second gate electrode corresponds to a second transistor device having a second threshold voltage that is different than the first threshold voltage.

12. The method of claim 11, wherein the third gate electrode is configured to mitigate leakage between the first transistor device and the second transistor device.

13. The method of claim 11, wherein the third gate electrode is associated with a third threshold voltage that is larger than the first threshold voltage and the second threshold voltage.

14. A method, comprising:
   forming a first fin of semiconductor material protruding outward from an upper surface of a substrate;
   forming one or more first gate electrodes extending along a first direction over the first fin;
   forming one or more second gate electrodes extending along the first direction over the first fin; and
   forming a dummy gate electrode over the first fin and laterally between the one or more first gate electrodes and the one or more second gate electrodes, the one or more first gate electrodes and the one or more second gate electrodes continuously extending along the first direction past an outermost sidewall of the dummy gate electrode.

15. The method of claim 14, further comprising:
   forming first source/drain regions within the first fin of semiconductor material and on opposing sides of the one or more first gate electrodes to form one or more n-type transistor devices; and
   forming second source/drain regions within the first fin of semiconductor material and on opposing sides of the one or more second gate electrodes to form one or more p-type transistor devices.

16. The method of claim 15, wherein the dummy gate electrode continuously extends along a second direction between one of the first source/drain regions and one of the second source/drain regions, the second direction being perpendicular to the first direction.

17. The method of claim 14,
wherein the one or more first gate electrodes comprise a plurality of first gate electrodes respectively corresponding to an n-type transistor; and
wherein the one or more second gate electrodes comprise a plurality of second gate electrodes respectively corresponding to a p-type transistor.

18. The method of claim 14, further comprising:
forming a second fin of semiconductor material protruding outward from the upper surface of the substrate, wherein the first fin and the second fin extend in a second direction in parallel to one another and are separated from one another along the first direction, the first direction being perpendicular to the second direction;
forming the one or more first gate electrodes to continuously extend over the first fin and the second fin;
forming the one or more second gate electrodes to continuously extend over the first fin and the second fin; and
forming a second dummy gate electrode extending over the second fin and having an outermost sidewall that is between the first fin and the second fin in the first direction.

19. The method of claim 14, wherein the one or more first gate electrodes are disposed within a first functional cell unit and the one or more second gate electrodes are disposed within a second functional cell unit.

20. The method of claim 14, wherein a first cross-section extending through the one or more first gate electrodes has a different structure than a second cross-section extending through the one or more second gate electrodes.

* * * * *